(12) United States Patent
Qiu et al.

(10) Patent No.: US 8,318,877 B2
(45) Date of Patent: *Nov. 27, 2012

(54) ETHYLENE TETRAFLUOROETHYLENE (METH)ACRYLATE COPOLYMERS

(75) Inventors: Weiming Qiu, Wilmington, DE (US); Anilkumar Raghavanpillai, Wilmington, DE (US); Peter Michael Murphy, Chadds Ford, PA (US); Jessica Louise Flatter, Geilenkirchen (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1226 days.

This patent is subject to a terminal disclaimer.

(21) Appl. No.: 12/154,082

(22) Filed: May 20, 2008

(65) Prior Publication Data

US 2009/0291222 A1 Nov. 26, 2009

(51) Int. Cl.
C08F 14/18 (2006.01)

(52) U.S. Cl. ........ 526/243; 526/245; 526/247; 526/248; 526/320; 526/343; 560/197; 560/223; 428/91; 428/96; 428/421; 427/254; 427/255.14; 427/255.6; 427/427.4; 427/427.6; 427/428.01; 427/429; 427/439; 427/440; 427/443.2

(58) Field of Classification Search .................. 526/245, 526/343, 243, 248, 247; 560/197, 223
See application file for complete search history.

(56) References Cited

U.S. PATENT DOCUMENTS

| | | | |
|---|---|---|---|
| 2,411,158 A | 11/1946 | Hanford | |
| 2,433,844 A | 1/1948 | Hanford | |
| 2,559,628 A | 7/1951 | Joyce, Jr. | |
| 2,562,547 A | 7/1951 | Hanford | |
| 3,016,407 A | 1/1962 | Brace | |
| 3,105,824 A | 10/1963 | Green et al. | |
| 3,253,978 A | 5/1966 | Bodendorf et al. | |
| 3,338,825 A | 8/1967 | Taggart | |
| 3,818,074 A | 6/1974 | Ahlbrecht | |
| 3,883,604 A | 5/1975 | Rudolph et al. | |
| 3,890,376 A | 6/1975 | Jäger | |
| 3,956,000 A | 5/1976 | Kuhls et al. | |
| 4,073,817 A | 2/1978 | Jager | |
| 4,219,681 A | 8/1980 | Schwenk et al. | |
| 4,612,357 A | 9/1986 | Bekiarian et al. | |
| 4,791,223 A | 12/1988 | Lantz et al. | |
| 5,268,516 A | 12/1993 | Bertocchio et al. | |
| 5,459,212 A | 10/1995 | Krespan et al. | |
| 5,481,028 A | 1/1996 | Petrov et al. | |
| 5,574,193 A | 11/1996 | Krespan et al. | |
| 5,639,923 A | 6/1997 | Von Werner | |
| 5,763,552 A | 6/1998 | Feiring et al. | |
| 5,908,966 A | 6/1999 | Krespan et al. | |
| 6,025,521 A | 2/2000 | Krespan et al. | |
| 6,136,373 A | 10/2000 | Back et al. | |
| 6,376,705 B1 | 4/2002 | Qiu | |
| 6,548,431 B1 | 4/2003 | Bansal et al. | |
| 6,797,655 B2 | 9/2004 | Rudisill | |
| 6,831,025 B2 | 12/2004 | Rudisill et al. | |
| 7,214,736 B2 | 5/2007 | Audenaert et al. | |
| 7,344,758 B2 | 3/2008 | Franchina et al. | |
| 7,390,917 B2* | 6/2008 | Homoto et al. | ............... 560/223 |
| 2002/0160116 A1 | 10/2002 | Nordal et al. | |
| 2005/0197273 A1 | 9/2005 | Savu et al. | |
| 2007/0142541 A1 | 6/2007 | Hintzer et al. | |
| 2008/0202384 A1 | 8/2008 | Peng et al. | |
| 2009/0148653 A1* | 6/2009 | Brown et al. | ................... 428/96 |
| 2009/0149096 A1* | 6/2009 | Brown et al. | ................... 442/80 |

FOREIGN PATENT DOCUMENTS

| | | |
|---|---|---|
| DE | 2654931 | 6/1977 |
| EP | 718262 | 12/1994 |
| EP | 1229352 A | 8/2002 |
| GB | 1 210 730 | 10/1970 |
| GB | 1 373 320 | 11/1974 |
| JP | 53141187 | 12/1978 |
| JP | 59033313 | 2/1984 |
| JP | 86036803 | 8/1986 |
| JP | 63222695 | 9/1988 |
| JP | 06157617 A | 6/1994 |
| JP | 06248014 A | 9/1994 |
| JP | 06248016 A | 9/1994 |
| JP | 07252447 | 10/1994 |
| JP | 6308575 A | 11/1994 |
| JP | 0853569 A | 2/1996 |
| JP | 08231165 A | 9/1996 |
| JP | 3269270 B2 | 3/2002 |
| JP | 2002128833 A | 5/2002 |
| JP | 2002316956 A | 10/2002 |

(Continued)

OTHER PUBLICATIONS

Haszeldine, Reactions of fluorocarbon radicals. I. The reaction of iodotrifluoromethane with theylene and tetrafluoroethylene; J. of the Chemical Society (1949), 2856-61. Abstract.

(Continued)

*Primary Examiner* — Nicole M Buie-Hatcher

(57) ABSTRACT

A copolymer composition comprising monomers copolymerized in the following percentages by weight:
(a) from about 20% to about 95% of a monomer, or mixture of monomers, of formula (I):

$$C_nF_{2n+1}(CH_2)_x[(CF_2CF_2)_y(CH_2CH_2)_z]_m\text{-L-C(O)—C(R)}{=}CH_2 \qquad (I)$$

wherein
R is H, Cl, F or $CH_3$,
L is O, S, NH, S—$(CH_2)_r$O, S—$(CH_2)_r$NH, OC(O)NH—$CH_2CH_2O$, NHC(O)NHCH$_2$CH$_2$O, S—$(CH_2)_r$OC(O)NHCH$_2$CH$_2$O, or S$(CH_2)_r$NHC(O)NHCH$_2$CH$_2$O,
and
(b) from about 5% to about 80% of at least one of:
(i) an alkyl (meth)acrylate monomer having a linear, branched or cyclic alkyl group of from about 6 to about 18 carbons; or
(II) a monomer of formula (II)

$$(R^2)_2N\text{—}R^3\text{—}O\text{—}C(O)\text{—}C(R){=}CH_2 \qquad (II)$$

wherein
R is H, Cl, F or $CH_3$,
each $R^2$ is independently a $C_1$ to $C_4$ alkyl; and
$R^3$ is a divalent linear or branched $C_1$ to $C_4$ alkylene; and
wherein the nitrogen is from about 40% to about 100% salinized; or
(iii) a mixture thereof.

20 Claims, No Drawings

FOREIGN PATENT DOCUMENTS

| | | | |
|---|---|---|---|
| JP | 2004131493 A | 4/2004 | |
| JP | 2004256406 A | 9/2004 | |
| JP | 2004269413 A | 9/2004 | |
| WO | WO 01/21678 A1 | 3/2001 | |
| WO | 2007080055 A | 7/2007 | |
| WO | WO 2008/019111 A2 | 2/2008 | |
| WO | 2009076109 A | 6/2009 | |

OTHER PUBLICATIONS

Afanas'Ev et al., Radical reaction of ethylene and tetrafluoroethylene with isopropyl halides; Zhurnal Obshchei Khimii (1966), 2(3), 423-6. Abstract.

Piccardi et al., Reactions of 3,3,4,4-Tetrafluorohexa-1,5-diene. Part II. Cyclisation to a Four-membered Ring in the Thermal Addition of Pentafluoroiodoethane; J. Chem. Soc. (3), (1971), 3959-3966. Abstract.

Santoro et al., Mass Spectra of Some Partially Fluorinated Aliphatic Compounds; Organic Mass Spectrometry (1973), 7, 123-131; Heyden & Son Limited. Printed in Northern Ireland.

Rondestvedt et al, Nucleophilic Displacements on β-(Perfluoroalkyl)ethyl Iodides. Synthesis of Acrylates Containing Heteroatoms, Journal of Organic Chemistry (1977), 42(16), 2680-2683.

Zhuravlev et al., Reactions of fluorine-containing free radicals in solution, III. Kinetics of the addition of CF3CH2, (CF3)2CH, and CH3CF2 radicals to fluoroethylenes; Zhurnal Organicheskoi Khimii (1983), 19(10), 2022-7. Abstract.

Szonyi, F. et al. Nouvelles methods de preparation des 2-F-alkylethylamines, Journal of Fluorine Chemistry (1991) 55, 85-92. Elsevier Sequoia, Lausanne. Abstract.

Trabelsi et al., Synthese des 2-F-alkylethylamines: optimization de l'obtention des azortures de 2-F-alkyethyle et de leur reduction en amines; Journal of Fluorine Chemistry (1994), 69, 115-117. Abstract.

Morelli et al, The vacuum pyrolysis and thermal degradation in air of irradiated poly(ethylene-co-tetrafluoroethylene) films; Journal of Analytical and Applied Pyrolysis (1995), 35, 121-141. Elsevier.

Naud et al., Synthesis of terminally perfluorinated long-chain alkanethiols, sulfides and disulfides from the corresponding halides, Journal of Fluorine Chemistry (2000), 104(2), 173-183. Elsevier.

Nixon et al., Pentafluoro-$\lambda^6$-sulfanyl ($SF_5$) perfluoroalkyl iodides—synthesis and reaction with ethylene and tetrafluoroethylene. Crystal structure of $SF_5(CF_2)_4CH_2CH_2I$; Journal of Fluorine Chemistry (2004), 125(4), 553-560.

Smirov et al., Effect of the surface treatment of reinforcing glass fabric on the strength properties of glass fiber composites based on thermoplastic matrix. Part V. Perfluorinated laminated matrixes; Plasticheskie Massy (2004), (9), 18-20, Publisher ZAO NP "Plasticheskie Massy". Abstract.

Honda et al. Molecular Aggregation Structure and Surface Properties of Poly(fluoroalkyl acrylate) Thin Films; Macromolecules (2005), 38, 5699-5705.

\* cited by examiner

ETHYLENE TETRAFLUOROETHYLENE (METH)ACRYLATE COPOLYMERS

FIELD OF THE INVENTION

The present invention relates to compositions comprising fluorinated copolymers useful for imparting surface properties to substrates. The copolymers are derived from copolymerization of monomers including fluorinated (meth)acrylates and other comonomers.

BACKGROUND OF THE INVENTION

Various compositions are known to be useful as treating agents to provide surface effects to substrates. Surface effects include repellency to moisture, oil, and stains, and other effects, which are particularly useful for fibrous substrates and other substrates such as hard surfaces. Many such treating agents are fluorinated polymers or copolymers containing one or more perfluoroalkyl groups.

Honda et al., in Macromolecules, 2005, 38, 5699-5705 show that for perfluoroalkyl chains of 8 carbons or greater, orientation of the perfluoroalkyl groups is maintained in a parallel configuration, while reorientation occurs for such chains having 6 carbon atoms or less. Such reorientation decreases surface properties such as receding contact angle. Thus, shorter chain perfluoroalkyls have traditionally not been successful commercially.

U.S. Pat. No. 3,890,376 discloses a preparation of (meth)acrylate monomers derived from fluoroalcohols having a perfluoroalkyl group having 6 or more carbon atoms linked to a vinylidine fluoride and ethylene linking groups. Pending patent application U.S. Ser. No. 11/712,324 discloses a copolymer composition derived from fluoroalcohols having 2 to 6 carbon atoms linked to vinylidene fluoride and ethylene linking groups, and copolymerized with nonfluorinated alkyl (meth)acrylates monomers and/or certain amino(meth)acrylates.

Customer requirements for these products are in a state of constant evolution, and there is a continuing need for new cost-effective, environmentally friendly chemical intermediates and products. Industry is constantly searching for compounds with minimum environmental impact, lower cost, and higher fluorine efficiency. In particular there is a need for additional fluorochemicals that impart significant water repellency, oil repellency, stain resistance, soil resistance, stain release, or wicking to fibrous substrates and hard surface substrates, wherein in some of the expensive fluorocarbon moieties have been replaced with less expensive and more readily biodegradable moieties. The present invention provides such compositions.

SUMMARY OF THE INVENTION

The present invention comprises a copolymer composition comprising monomers copolymerized in the following percentages by weight:

(a) from about 20% to about 95% of a monomer, or mixture of monomers, of formula (I):

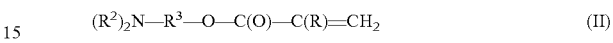

$$C_nF_{2n+1}(CH_2)_x[(CF_2CF_2)_y(CH_2CH_2)_z]_m\text{-L-C(O)—C(R)}=CH_2 \quad (I)$$

wherein

R is H, Cl, F or $CH_3$,

L is O, S, NH, S—$(CH_2)_r$O, S—$(CH_2)_r$NH, OC(O)NH—$CH_2CH_2$O, NHC(O)NHCH$_2$CH$_2$O, S—$(CH_2)_r$OC(O)NHCH$_2$CH$_2$O, or S$(CH_2)_r$NHC(O)NHCH$_2$CH$_2$O, subscript n is an integer from 1 to about 6, subscript x is an integer from 1 to about 6, subscripts y, z and m are each independently 1, 2 or 3 or a mixture thereof, subscript r is from 1 to about 10, and wherein the total number of carbons in the fluorocarbon-hydrocarbon chain segment (formula (I) excluding L-C(O)—C(R)=CH2) ranges from about 8 to about 22, and (b) from about 5% to about 80% of at least one of:

(i) an alkyl(meth)acrylate monomer having a linear, branched or cyclic alkyl group of from about 6 to about 18 carbons; or (II) a monomer of formula (II)

$$(R^2)_2N—R^3—O—C(O)—C(R)=CH_2 \quad (II)$$

wherein

R is H, Cl, F or $CH_3$, each $R^2$ is independently a $C_1$ to $C_4$ alkyl; and $R^3$ is a divalent linear or branched $C_1$ to $C_4$ alkylene; and wherein the nitrogen is from about 40% to 100% salinized; or (iii) a mixture thereof.

The present invention further comprises a method of treating a substrate to impart oil repellency, water repellency, stain resistance, soil resistance, wicking, and stain release comprising contacting the substrate with a copolymer composition of the invention as disclosed above.

The present invention further comprises a substrate having contacted a copolymer composition of the invention as described above.

DETAILED DESCRIPTION OF THE INVENTION

Herein all trademarks are designated with capital letters. All patents cited herein are hereby incorporated by reference.

The term "(meth)acrylate" encompasses esters of methacrylic acid and acrylic acid unless specifically stated otherwise. For instance, hexyl (meth)acrylate encompasses both hexyl acrylate and hexyl methacrylate. Herein the terms "fluorinated acrylate(s)" and "fluorinated thioacrylate(s)" refer to compounds of formula (I), wherein R is selected from the group consisting of H, Cl, F, and CH3, unless specifically defined otherwise.

The present invention comprises a copolymer composition that imparts significant water repellency, oil repellency, stain resistance, soil resistance, stain release, and wicking to substrates treated therewith wherein the copolymer contains a perfluoroalkyl group of one to six carbons. The copolymer comprises component (a) of formula (I) as defined above, and at least one component (b)(i), (b)(ii), or a mixture thereof, as defined above. The copolymer optionally further comprises at least one additional monomer (c), monomer (d), monomer (e), or any mixture of such additional monomers, as defined hereinafter in further embodiments.

In all embodiments of the invention, including methods, compositions, substrate provided by said methods, and substrates having been contacted with said compositions, preferred copolymers comprise monomers of formula (I) above, wherein R is H or $CH_3$, L is O, subscript n is an integer from 2 to 4, subscript x is 2, subscripts y, z and m are each independently 1, or 2, or their mixture. More preferred are copolymers comprising such monomers of formula (I) wherein subscript n is an integer from 2 to 3, and subscripts y, z and m are 1. Most preferred are copolymers comprising such monomers of formula (I) wherein n is 2.

One embodiment of the present invention is a copolymer composition comprising monomers copolymerized in the following percentages by weight: component (a) comprising

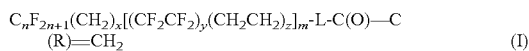

from about 20% to about 95%, and preferably from about 40% to about 95%, of a monomer, or mixture of monomers, of formula (I)

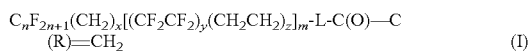

$$C_nF_{2n+1}(CH_2)_x[(CF_2CF_2)_y(CH_2CH_2)_z]_m\text{-L-C(O)}\text{—C(R)}\text{=}CH_2 \quad (I)$$

wherein

R is H, Cl, F or CH$_3$,

L is O, S, NH, S—(CH$_2$)$_r$O, S—(CH$_2$)$_r$NH, OC(O)NH—CH$_2$CH$_2$O, NHC(O)NHCH$_2$CH$_2$O, S—(CH$_2$)$_r$OC(O)NHCH$_2$CH$_2$O, or S(CH$_2$)$_r$NHC(O)NHCH$_2$CH$_2$O, subscript n is an integer from 1 to about 6, subscript x is an integer from 1 to about 6, subscripts y, z and m are each independently 1, 2 or 3 or a mixture thereof, subscript r is from 1 to about 10, and wherein the total number of carbons in the fluorocarbon-hydrocarbon chain segment ranges from about 8 to about 22, and component (b)(i) comprising from about 5% to about 80%, and preferably from about 5% to about 60%, of one or more components of an alkyl(meth)acrylate monomer having a linear, branched or cyclic alkyl group having from about 6 to about 18 carbons. More preferably the copolymer composition comprises from about 50% to about 85%, and more preferably from about 60% to about 85%, by weight of component (a), that is, the monomers of formula (I). Preferably the proportions of component (b)(i) alkyl methacrylates is between about 15% to about 30% by weight. Preferred alkyl (meth)acrylate monomers include stearyl (meth)acrylate, 2-ethylhexyl(meth)acrylate, hexyl(meth)acrylate, cyclohexyl(meth)acrylate, lauryl(meth)acrylate, tridecyl(meth)acrylate, or a mixture thereof. Of the foregoing, stearyl(meth)acrylate and 2-ethylhexyl(meth)acrylate are most preferred.

Another embodiment of the invention is a copolymer composition comprising monomers copolymerized in the following percentages by weight: component (a) comprising from about 20% to about 95%, and preferably from about 40% to about 95%, of a monomer, or mixture of monomers, of formula (I), as defined above; and component (b)(ii) comprising from about 5% to about 80%, and preferably from about 5% to about 60%, of one or more monomers of formula (II):

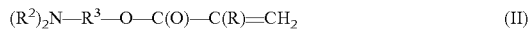

$$(R^2)_2N\text{—}R^3\text{—O—C(O)—C(R)}\text{=}CH_2 \quad (II)$$

wherein

R is H, Cl, F or CH$_3$, each R$^2$ is independently a C$_1$ to C$_4$ alkyl,

R$^3$ is a divalent linear or branched C$_1$ to C$_4$ alkylene, and wherein the nitrogen is from about 40% to 100% salinized. Preferably component (a) is present at from about 50% to about 85% by weight and component (b)(ii) is present at from about 10% to about 40% by weight. Preferred monomers of formula (II) include 2-(N,N-dimethylamino)ethyl (meth)acrylate, and 3-(N,N-dimethylamino)propyl (meth)acrylate.

The term "wherein the nitrogen is from about 40% to 100% salinized" means that the nitrogen atom of monomer (II) is present in a protonated or alkylated form or a partially protonated or partially alkylated form. This can be accomplished before, during or after the polymerization of the monomers. The salinization of the nitrogen of formula (II) provides useful water dispersibility properties to the polymers derived therefrom. A convenient and preferred approach to providing copolymers comprising partially or fully salinized monomers of formula (II) comprises polymerizing to provide a copolymer composition, followed by dispersing the copolymer with an aqueous acid solution. Examples of such acids are hydrochloric, hydrobromic, sulfuric, nitric, phosphoric, acetic, formic, propionic or lactic acids. Preferably, acetic acid is used, and preferably the nitrogen is fully salinized. Full salinization can be accomplished by using about 1 to about 2 equivalents of acid, based on the equivalents of monomer (II) present in the copolymer.

Another embodiment of the invention is a copolymer composition comprising monomers copolymerized in the following percentages by weight: component (a) comprising from about 20% to 95%, and preferably from about 40% to about 95%, of a monomer, or mixture of monomers, of formula (I), as defined above; and component (b) from about 5% to about 80%, and preferably from about 5% to about 60%, of a mixture of monomers of (b)(i) an alkyl(meth)acrylate and (b)(ii) formula (II), each as defined above.

Another embodiment of the present invention comprises a copolymer composition comprising component (a) as defined above, component (b)(i) or (b)(ii) or a mixture thereof as defined above, and further comprising at least one additional monomer copolymerized in the following percentage by weight:

(c) from about 1% to about 35% vinylidene chloride, vinyl chloride, or vinyl acetate, or a mixture thereof; or (d) from about 0.5% to about 25% of at least one monomer selected from the group consisting of styrene, methyl-substituted styrene, chloromethyl-substituted styrene, 2-hydroxyethyl(meth)acrylate, ethylenediol di(meth)acrylate, N-methyloyl(meth)acrylamide, C$_1$-C$_5$ alkyl (meth)acrylate, 2-acrylamido-2-methyl-1-propane sulfonic acid (AMPS), and a compound of formula (III):

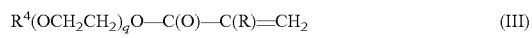

$$R^4(OCH_2CH_2)_qO\text{—C(O)—C(R)}\text{=}CH_2 \quad (III)$$

wherein q is 2 to about 10;

R$^4$ is H, a C$_1$ to C$_4$ alkyl, or CH$_2$=C(R)C(O)—O—; and

R is H, Cl, F or CH$_3$; or (e) from about 0.5% to about 10% of at least one monomer of formula (IV)

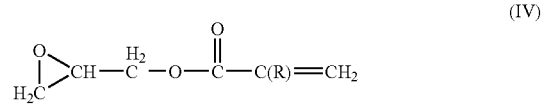

wherein

R is H, Cl, F or CH$_3$; or (f) any combination thereof.

Thus monomers (a) and (b) are copolymerized with 1) monomer (c), 2) monomer (d), 3) monomer (e), 4) monomers (c) and (d), 5) monomers (d) and (e), 6) monomers (c) and (e), or 7) monomers (c), (d), and (e).

A preferred embodiment of the present invention comprises a copolymer composition comprising component (a) as defined above, and component (b)(i) or (b)(ii) or a mixture thereof as defined above, and wherein the additional monomer copolymerized is component (c), defined as from about 1% to about 35% by weight of vinylidene chloride, vinyl chloride, vinyl acetate, or a mixture thereof. Preferred compositions comprise component (a), component (b)(i), and from about 10% to about 30% of component (c) and, most preferably the monomer (c) is vinylidene chloride, vinyl chloride, or a mixture thereof.

Another preferred embodiment of the present invention comprises a copolymer composition comprising component (a) as defined above, component (b)(i) or (b)(ii) or a mixture thereof as defined above, and wherein the additional monomer is component (d) defined as from about 0.5% to about 25%, on a weight basis, of one or more monomers selected from the group consisting of: styrene, methyl-substituted styrene, chloromethyl-substituted styrene, 2-hydroxyethyl (meth)acrylate, ethylenediol di(meth)acrylate, N-methyloyl (meth)acrylamide, $C_1$-$C_5$ alkyl (meth)acrylate, and compounds of formula (III) as defined previously.

Of the foregoing, 2-hydroxyethyl(meth)acrylate, ethylenediol di(meth)acrylate, N-methyloyl(meth)acrylamide, and compounds of formula (III) wherein q is 4 to 10 and $R^4$ is hydrogen are most preferred. Preferably component (d) comprises about 3% to about 10% on a weight basis, of the copolymer formulation.

Another preferred embodiment of the present invention comprises a copolymer composition comprising component (a) as defined above, component (b)(i) or (b)(ii) or a mixture thereof as defined above, and wherein the additional monomers are component (c) and component (d), each as defined above. A preferred composition comprises component (a), component (b)(i), component (c), and component (d). The same preferences expressed above for component (d) are applicable in this embodiment.

Another embodiment of the present invention comprises a copolymer composition comprising component (a) as defined above, component (b)(i) or (b)(ii) or a mixture thereof as defined above, optionally component (c) as defined above; and further comprising component (e) which is from about 0.5% to about 10% of one or more monomers of formula (IV) as defined above. Preferably component (e) comprises from about 0.5% to about 3% on a weight basis, of the copolymer formulation.

In all of the embodiments of the present invention the percentages by weight of the monomers that are copolymerized to form the copolymer are chosen so that 1) the weight percent for each is within the range disclosed above, and 2) the total of the weight percents of the monomers adds up to 100%. Thus when optional monomers (c), (d), and/or (e) are present, the amounts (weight percents) of monomers (a) and/or (b) must be adjusted within the stated ranges for each to accommodate the presence of the optional monomers. For example, if monomer (c) is present at 1% by weight, the amount of monomer (a) and monomer (b) present will be chosen to add up to 99%, so that the total of monomers (a) plus (b) plus (c) is equal to 100%. For another example, if monomer (c) is present at 5%, monomer (d) is present at 18%, and monomer (e) is present at 7%, then the amount of monomer (a) and monomer (b) are chosen to add up to [100%−(5%+18%+7%)]=70%, so that the total of monomers (a) plus (b) plus (c) plus (d) plus (e) is equal to 100%. One skilled in the art can easily choose weight percentages for each monomer within the stated ranges so that the total equals 100%.

Emulsion polymerization can be employed to prepare the copolymer compositions of the invention. The polymerization is carried out in a reactor fitted with a stirrer and external means for heating and cooling the charge. The monomers to be polymerized together are emulsified in an aqueous solution containing a suitable surfactant, and optionally an organic solvent, to provide an emulsion concentration of 5% to 50% by weight. Typically volatile monomers, such as vinyl chloride and vinylidene chloride, are added directly to the reactor and not pre-emulsified. The temperature is raised to about 40° C. to about 70° C. to effect polymerization in the presence of an added free radical initiator. A suitable initiator is any of the commonly known agents for initiating the polymerization of an ethylenically unsaturated compound. Such commonly employed initiators include 2,2'-azodi-isobutyramidine dihydrochloride; 2,2'-azodiisobutyro-nitrile; 2,2'-azobis(2-methylpropionamidine) dihydrochloride and 2,2' azobis(2,4-dimethyl-4-methoxyvaleronitrile. The concentration of added initiator is usually 0.1 to about 2 weight percent, based on the weight of the monomers to be polymerized. To control molecular weight of the resulting polymer, small amounts of a chain-transfer agent, such as an alkylthiol of 4 to about 18 carbon atoms, is optionally present during polymerization.

The surfactants used in this polymerization are any of those cationic, anionic, nonionic and amphoteric surfactants commonly used for preparing aqueous emulsions. Suitable cationic agents include, for example, dodecyltrimethylammonium acetate, trimethyltetradecylammonium chloride, hexadecyltrimethylammonium bromide, trimethyloctadecylammonium chloride, ethoxylated alkyl amine salts, and others. A preferred example of a suitable cationic surfactant is the chloride salt of an ethoxylated alkyl ammonium salt such as an 18-carbon alkylamine with 15 moles of ethylene oxide such as ETHOQUAD 18/25 available from Akzo Nobel, Chicago, Ill. Nonionic surfactants which are suitable for use herein include condensation products of ethylene oxide with 12-18 carbon atom fatty alcohols, 12-18 carbon fatty acids, alkyl phenols having 8-18 carbon atoms in the alkyl group, 12-18 carbon atom alkyl thiols and 12-18 carbon atom alkyl amines. A preferred example of a suitable nonionic surfactant, if used in combination with the cationic surfactant, is an ethoxylated tridecyl alcohol surfactant such as MERPOL SE available from Stepan Company, Northfield, Ill. Suitable anionic surfactants which are used herein include alkyl carboxylic acids and their salts, alkyl hydrogen sulfates and their salts, alkyl sulfonic acids and their salts, alkyl ethoxy sulfates and their salts, alpha olefin sulfonates, alkylamidoalkylene sulfonates, and the like. Generally preferred are those wherein the alkyl groups have 8-18 carbon atoms. Especially preferred is an alkyl sulfate sodium salt where the alkyl group averages about 12 carbons, such as SUPRALATE WAQE surfactant, available from Witco Corporation, Greenwich, Conn.

Alternatively, solution polymerization in a suitable organic solvent can be used to prepare the copolymer compositions of the invention. Solvents which can be used for the polymerization include, but are not limited to: ketones, for example, acetone, methyl ethyl ketone (MEK), and methyl isobutyl ketone (MIBK); alcohols, for example isopropanol; esters, for example butyl acetate; and ethers, for example, methyl t-butyl ether. The monomers to be polymerized together are charged to a reactor as described above, together with a solvent. Typically the total monomer concentration in the organic solvent or mixture of organic solvents can be from about 20% to about 70% by weight. The temperature is raised to about 60° C. to about 90° C. to effect polymerization in the presence of at least one initiator, used in a proportion of 0.1 to 2.0% relative to the total weight of monomers. Initiators useful to effect polymerization in solution include: peroxides, for example benzoyl peroxide and lauryl peroxide; and azoic compounds for example, 2,2'-azobisisobutyronitrile, and 2,2'-azobis(2-methylbutyronitrile). To control molecular weight, optionally a chain-transfer agent, such as an alkylthiol, described above, can be used.

The fluorinated acrylates and fluorinated thioacrylates of formula (I), useful in forming the compositions of the invention, are prepared from the corresponding fluorinated alcohols and fluorinated thiols by esterification with acrylic acid, methacrylic acid, 2-chloroacrylic acid or 2-fluoroacrylic acid using procedures as described in U.S. Pat. No. 3,282,905 and European Patent 1632542 A1. Alternatively, acrylate and methacrylate esters of formula (I) can be made from the corresponding nitrate esters according to the procedures disclosed in U.S. Pat. No. 3,890,376.

The alkyl(meth)acrylates and amino (meth)acrylates of formula (II) are commercially available from Aldrich Chemical Company, Milwaukee, Wis.

Fluorinated alcohols and thiols useful in forming fluorinated acrylates of formula (I) include those of formula (V):

$$C_nF_{2n+1}(CH_2)_x[(CF_2CF_2)_y(CH_2CH_2)_z]_m-XH \quad (V)$$

wherein

X is O or S, subscript n is an integer from 1 to about 6, subscript x is an integer from 1 to about 6, subscripts y, z and m are each independently 1, 2 or 3 or mixture thereof, and wherein the total number of carbons in the fluorocarbon-hydrocarbon chain segment of formula (V) ranges from about 8 to about 22.

The alcohols of formula $C_nF_{2n+1}(CH_2)_x[(CF_2CF_2)_y(CH_2CH_2)_z]_mOH$, wherein m, n, x, y, and z are as defined above are prepared from oligomeric iodides using an oleum treatment and hydrolysis. We found that reacting with oleum (15% $SO_3$) at 60° C. for 1.5 hours followed by hydrolysis using an iced dilute $K_2SO_3$ solution followed by heating to 100° C. for 30 minutes gives satisfactory results, but other reaction conditions can also be used. After being cooled to room temperature, a solid was precipitated. The liquid is then decanted and the solid is dissolved in ether and washed with water saturated with NaCl, dried over anhydrous $Na_2SO_4$, and concentrated and dried under vacuum. Other purification procedures can be used.

Alternatively, the alcohols may be prepared by heating oligomeric iodides with N-methylformamide to 150° C. and holding for 19 hours. The reaction mixture is washed with water to give a residue. A mixture of this residue with ethanol and concentrated hydrochloric acid is gently refluxed (85° C. bath temperature) for 2.5 hours. The reaction mixture is washed with water, diluted with dichloromethane, and dried over sodium sulfate. The dichloromethane solution is concentrated and distilled at reduced pressure to give the alcohol. Optionally N,N dimethylformamide can be used instead of N-methylformamide. Other purification procedures can also be used.

The thiols of formula (V) are available from the oligomeric iodides by treatment with a variety of reagents according to procedures described in J. Fluorine Chemistry, 104, 2 173-183 (2000). One example is the reaction of the oligomeric iodides with sodium thioacetate, followed by hydrolysis with sodium hydroxide. Alternatively, thiols of formula (V) are prepared by the reaction with thiourea followed by hydrolysis of the thiouronium salt as per the literature procedure (Rondestvedt, C. S., Jr.; Thayer, G. L., Jr. J. Org. Chem. 1977, 42, 2680). The oligomeric iodides were refluxed with thiourea in ethanol for 36 hours and hydrolyzed using sodium hydroxide to obtain the corresponding oligomeric thiols.

These alcohols and thiols of formula (V) are derived from oligomer iodides. The iodides are generated by the oligomerization of fluoroalkyl iodides by a mixture of tetrafluoroethylene and ethylene to produce fluorinated oligomeric ethylene-tetrafluoroethylene iodides. The products of this oligomerization and subsequent reactions are comprised in a composition described by the formula:

$$C_nF_{2n+1}(CH_2)_x[(CF_2CF_2)_y(CH_2CH_2)_z]_mG, \quad (VI)$$

wherein

G is an iodide (I); hydroxyl (OH); acrylate (OC(O)CH=CH$_2$); methacrylate (OC(O)CCH$_3$=CH$_2$); chloroacrylate (OC(O)CCl=CH$_2$); amine (NR$_1$H); azide (N$_3$); isocyanate (NCO); thiol or thiol derivative SQ wherein Q=H, alkyl, (CH$_2$)$_r$OH, or (CH$_2$)$_r$NH$_2$, (CH$_2$)$_r$OC(O)C(Me)=CH$_2$, (CH$_2$)$_r$NHC(O)C(Me)=CH$_2$, (CH$_2$)$_r$NHC(O)NHCH$_2$CH$_2$O, or (CH$_2$)$_r$OC(O)NHCH$_2$CH$_2$O; thiocyanate (SCN); carboxylic acid (COOH); sulfonic acid (SO$_3$H); acrylamide (NHCOCH=CH$_2$); methacrylamide (NHCOC(CH$_3$)=CH$_2$); or urethane (meth)acrylate group [OC(O)NHCH$_2$CH$_2$OC(O)C(CH$_3$)=CH$_2$] and [OC(O)NHCH$_2$CH$_2$OC(O)C(CH$_3$)=CH$_2$];

subscript n is from 1 to about 6, preferably from about 2 to about 4, and most preferably 2;

subscript x is from 1 to about 6, preferably 1 or 2, most preferably 2;

subscripts y, z and m are independently 1, 2 or 3, or a combination thereof; preferably, y and z are each 1, and m is 1 or 2;

subscript r is from 1 to about 10, and the total number of carbons in the fluorocarbon-hydrocarbon chain (formula VI excluding G) ranges from about 8 to about 22.

Preferred embodiments of formula (VI) include 1,1,2,2,5,5,6,6-octahydroperfluoro-1-G-octane, or 1,1,2,2,5,5,6,6,9,9,10,10-dodecahydroperfluoro-1-G-decane, or their mixture, wherein G is defined as above.

The initial product of this oligomerization reaction is a mixture of closely related oligomers. In addition to the major resulting oligomer, there will be other oligomers with slightly longer or shorter chain lengths, as is the nature of such reactions. There will also be a small percentage of oligomers where the ethylene and tetrafluoroethylene do not alternate, but depart from the expected alternating sequence. The above formula (IV) is intended to comprise not only the original mixture of oligomers from the oligomerization reaction and its alcohol, (meth)acrylate and thioacrylate derivatives, but also a purified or partially purified form of these mixtures, as well the individual components of each mixture.

If desired, the major chemicals in this mixture can be separated into individual components by differences in solubilities, melting points, vapor pressures and other features. For example, we have found the relative solubilities of such components in acetonitrile and tetrahydrofuran to be useful in such purifications, as shown in the examples which follow. Other solvents and methods may also be used, as readily determined by those skilled in the art.

From a practical viewpoint, anything beyond the most simple purification is likely to be an unnecessary expense. When converted into the ultimate derived derivative product, all of these oligomers are expected to show similar properties to the major oligomer, and be useful additions to the final product.

The fluoroalkyl iodides useful as telogens for this reaction include $C_nF_{2n+1}CH_2CH_2I$, $C_nF_{2n+1}CH_2I$ and $C_nF_{2n+1}I$, wherein n is an integer from 1 to 6. Preferably n is from 2 to 4; more preferably it is 2. The most preferable fluoroalkyl iodide is perfluoroethylethyl iodide.

The iodides of formula $C_nF_{2n+1}(CH_2)_x[(CF_2CF_2)_y(CH_2CH_2)_z]_mI$, wherein m, n, x, y, and z are as described above, are preferably prepared by oligomerization of $C_nF_{2n+1}C_2H_4I$, $C_nF_{2n+1}CH_2I$ or $C_nF_{2n+1}I$ using a mixture of ethylene and tetrafluoroethylene. The reaction may be run at any temperature from room temperature to 150° C. with a suitable radical initiator, preferably at temperature of from 40° to 100° C. with an initiator which has a 10 hour half-life in that range. The feed ratio of the starting materials, that is the moles of $C_nF_{2n+1}C_2H_4I$, $C_nF_{2n+1}CH_2I$, or $C_nF_{2n+1}I$ vs the combined moles of ethylene and tetrafluoroethylene, can be used to control conversion of the reaction. This mole ratio is from about 1:3 to about 20:1. The mole ratio of ethylene to tetrafluoroethylene is from about 1:10 to about 10:1, preferably from about 3:7 to about 7:3, more preferably from about 4:6 to about 6:4.

The general methods described above for preparation of the copolymers of the present invention are described in more detail in the Examples herein. It will be appreciated that many variations on the above processes can be used by those skilled in the art.

The present invention further comprises a method of treating a substrate to impart oil repellency, water repellency, soil resistance, stain resistance, stain release, and wicking comprising contacting the substrate with a copolymer composition of the invention as previously defined. FG or fibrous substrates the method of the present invention also imparts stain release and wicking properties to the substrate. The composition of the invention is applied directly to a substrate. The composition is applied alone or in admixture with dilute nonfluorinated polymers, or with other treatment agents or finishes. The composition can be applied at a manufacturing facility, retailer location, or prior to installation and use, or at a consumer location.

The copolymer composition of the present invention can be used as an additive during the manufacture of substrates. It is added at any suitable point during manufacture. For example, in the case of paper, the copolymer is added to the paper pulp in a size press. Preferably, from about 0.3% to about 0.5% by weight of the composition of the invention is added to paper pulp, based on the dry solids of the composition and dry paper fiber.

The composition of the present invention is generally applied to hard surface substrates by contacting the substrate with the composition by conventional means, including, but not limited to, brush, spray, roller, doctor blade, wipe, immersion, dip techniques, foam, liquid injection, and casting. Optionally, more than one coat can be applied, particularly on porous surfaces. When used on stone, tile and other hard surfaces, the compositions of the invention are typically diluted with water to give an application solution having from about 0.1% by weight to about 20% by weight, preferably from about 1.0% by weight to about 10% by weight, and most preferably from about 2.0% by weight to about 5.0% by weight, of the composition based on solids. The coverage as applied to a substrate is about 100 g of application solution per sq meter ($g/m^2$) for semi-porous substrates (e.g. limestone) and about 200 $g/m^2$ for porous substrates (e.g. Saltillo). Preferably the application results in from about 0.1 $g/m^2$ to about 2.0 $g/m^2$ of solids being applied to the surface.

The compositions of the invention are generally applied to fibrous substrates, such as nonwovens, fabrics, and fabric blends, as aqueous emulsions, dispersions, or solutions by spraying, dipping, padding, or other well-known methods. The copolymers of the invention are generally diluted with water to concentrations of about 5 g/L to about 100 g/L, preferably about 10 g/L to about 50 g/L, based upon the weight of the fully formulated emulsion. After excess liquid has been removed, for example by squeeze rolls, the treated fabric is dried and then cured by heating, for example, to 110° C. to 190° C., for at least 30 seconds, typically from about 60 to about 180 seconds. Such curing enhances repellency and durability. While these curing conditions are typical, some commercial apparatus may operate outside these ranges because of its specific design features.

The composition of this invention is contacted with the substrate as such, or in combination with other finishes or surface treating agents. The composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate.

In particular for fibrous substrates, when textiles such as synthetic or cotton fabrics are treated, a wetting agent can be used, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes can also be present such as surfactants, pH adjusters, cross linkers, wetting agents, wax extenders, and other additives known by those skilled in the art. Suitable surfactants include anionic, cationic, and nonionic. Preferred is an anionic surfactant such as sodium lauryl sulfonate, available as DUPONOL WAQE from Witco Corporation, Greenwich, Conn. Examples of such finishes or agents include processing aids, foaming agents, lubricants, anti-stains, and the like. The composition is applied at a manufacturing facility, retailer location, or prior to installation and use, or at a consumer location.

Optionally a blocked isocyanate to further promote durability can be added to the fluorinated polymers of the present invention (i.e., as a blended isocyanate). An example of a suitable blocked isocyanate is HYDROPHOBAL HYDROPHOBOL XAN available from Ciba Specialty Chemicals, High Point, N.J. Other commercially available blocked isocyanates are also suitable for use herein. The desirability of adding a blocked isocyanate depends on the particular application for the treating agent. For most of the presently envisioned applications, it does not need to be present to achieve satisfactory cross-linking between chains or bonding to the substrate. When added as a blended isocyanate, amounts up to about 20% by weight are added.

Optionally, nonfluorinated extender compositions can be included in the application composition to obtain some combination of benefits. Examples of such an optional additional extender polymer composition is that disclosed in U.S. Pat. No. 7,344,758.

The present invention further comprises substrates having contacted compositions of the invention, as described above. Substrates useful in the invention include hard surface substrates and fibrous substrates. Preferred substrates, having contacted compositions of the invention, have fluorine contents of from about 0.05% by weight to about 0.5% by weight.

Hard surface substrates include porous and non-porous mineral surfaces, such as glass, stone, masonry, concrete, unglazed tile, brick, porous clay and various other substrates with surface porosity. Specific examples of such substrates include unglazed concrete, brick, tile, stone including granite, limestone and marble, grout, mortar, statuary, monuments, composite materials such as terrazzo, and wall and ceiling panels including those fabricated with gypsum board.

Fibrous substrates include textiles, nonwovens, fabrics, fabric blends, carpet, wood, paper and leather. Textiles and fabrics comprise polyamides including but not limited to polyamide-6,6 (PA-66), polyamide-6 (PA-6), and polyamide- 6,10 (PA-610), polyesters including but not limited to polyethylene terephthalate (PET), polytrimethylene terephthalate, and polybutylene terephthalate (PBT); rayon; cotton; wool; silk; hemp; and combinations thereof. Nonwoven materials include fibers of glass, paper, cellulose acetate and nitrate, polyamides, polyesters, polyolefins including bonded polyethylene (PE) and polypropylene (PP), and combinations thereof. Specific nonwovens include, for instance, polyolefins including PE and PP such as TYVEK (flash spun PE fiber), SONTARA (nonwoven polyester), and XAVAN (nonwoven PP), SUPREL, a nonwoven spunbond-meltblown-spunbond (SMS) composite sheet comprising multiple layers of sheath-core bicomponent melt spun fibers and side-by-side bicomponent meltblown fibers, such as described in U.S. Pat. No. 6,548,431, U.S. Pat. No. 6,797,655 and U.S. Pat. No. 6,831,025, all such nonwovens being trademarked products of E. I. du Pont de Nemours and Company, Wilmington, Del.; nonwoven composite sheets comprising sheath-core bicomponent melt spun fibers, such as described in U.S. Pat. No. 5,885,909; other multi-layer SMS nonwovens that are known in the art, such as PP spunbond-PP meltblown-PP spunbond laminates; nonwoven glass fiber media that are known in the art and as described in U.S. Pat. No. 3,338,825, U.S. Pat. No. 3,253,978, and references cited therein; and KOLON (spunbond polyester, a trademarked product of Korea Vilene, Seoul, South Korea). The nonwoven materials include those formed by web forming processing including dry laid (carded or air laid), wet laid, spunbonded and melt blown. The nonwoven web can be bonded with a resin, thermally bonded, solvent bonded, needle punched, spun-laced, or stitch-bonded. The bicomponent melt spun fibers, referred to above, can have a sheath of PE and a core of polyester. If a composite sheet comprising multiple layers is used, the bicomponent melt-blown fibers can have a polyethylene component and a polyester component and be arranged side-by-side along the length thereof. Typically, the side-by-side and the sheath/core bicomponent fibers are separate layers in the multiple layer arrangement.

Preferred fibrous substrates for practicing the invention include one or more materials selected from the group consisting of cotton, rayon, silk, wool, hemp, polyester, spandex, polypropylene, polyolefin, polyamide, aramid, and blends or combinations thereof. Preferred nonwovens comprise paper, cellulose acetate and nitrate, polyamides, polyesters, polyolefins, and combinations thereof. Most preferred nonwoven are bonded polyethylene, polypropylene, polyester, and combinations thereof.

The compositions and methods of the present invention are useful to provide one or more of excellent water repellency, oil repellency, soil resistance, stain release, and wicking to treated substrates. The compositions of the present invention allow for the use of shorter perfluoroalkyl groups containing 6 or fewer fluorinated carbon atoms for increased fluorine efficiency in the protection of treated surfaces. The present invention also allows for the use of copolymers having minimal environmental impact.

Materials, Application Methods, and Test Methods

The following materials, methods of application of copolymer to substrate, and test methods were used in the Examples herein.
Application Methods Onto Substrates
Textile Fabrics (A): The fluorinated (meth)acrylate polymer emulsions of the invention were diluted with deionized water containing about 2 grams/liter of ALKANOL 6112 (available from E. I. du Pont de Nemours and Company, Wilmington Del.) to form a treatment bath used to achieve the goal fluorine by weight on the fabric after padding and drying. The treatment bath was applied to the fabric in a pad application, in which the fabric was passed through a trough containing water and treatment compounds for approximately two seconds, and passed between two rolls with an applied pressure to achieve a wet pick up of between about 60 and 150 grams of the bath for every 100 grams of textile fabric. The fabric was dried to a temperature approximately 160° C., and held at that temperature for 3 minutes.

Textile Fabrics (B): Textile fabric was treated with the fluorinated (meth)acrylate solutions of the present invention using the following process. Copolymer solutions were prepared in tetrahydrofuran to contain 2000 mg/kg of fluorine. The solutions were applied to fabric substrates by pipetting the copolymer solution onto substrates to saturation. After application, the substrate was dried in air and cured at approximately 150° C. for about 2 minutes. The substrate was allowed to cool down to room temperature before the oil and water repellency measurements were conducted.

Nonwoven Fabrics: The nonwoven fabrics were treated using a pad dipping process with a bath formulation containing the fluorinated (meth)acrylate polymer emulsions of the invention diluted with deionized water containing about 2 grams/liter of ALKANOL 6112 (available from E. I. du Pont de Nemours and Company, Wilmington Del.) to achieve the goal fluorine by weight on the fabric after padding and drying. The wet pick-up % for the nonwoven fabric was between about 80% and 110%. After application of the dispersions, the treated nonwoven fabric was dried and cured in an oven until the fabric reached 250° F. (120° C.) and remained at that temperature for 3 minutes. The treated fabrics were conditioned according to ASTM D1776 for a minimum of 4 hours prior to testing.

Carpet: A 784 cm$^2$ carpet sample (approximately 28 cm or 11 inches square) was moistened with 10 g of water using a trigger sprayer from WB Bottle Supply Co., Inc., Milwaukee, Wis. The carpet sample was then sprayed using a trigger sprayer with 22 g of a mixture of the fluorinated (meth) acrylate polymer emulsions of the invention and 100 g of water or approximately 25% wet pick up based on the face weight of the carpet. The goal fluorine level of micrograms of fluorine per gram of carpet fiber pile determined the concentration of the fluorinated (meth)acrylate polymer emulsions of the invention in the aqueous mixture spray applied to the carpet. The surface pile of the carpet was rolled with a small roller (7 cm wide) to mechanically spread the partially fluorinated urethane polymer dispersion coating across the entire carpet pile. The carpet sample was dried an oven at 65° C. for 20 minutes then immediately placed in a second oven at 150° C. and cured for 3 minutes. The carpet was cooled and conditioned for at least 4 hours at approximately 22° C. and 75% relative humidity prior to any evaluations.

Tile: Square tiles of 12 inch square (30.5 cm$^2$) of a sample Saltillo (Euro Beige) were rinsed to remove any dust or dirt and allowed to dry thoroughly, typically for at least 24 hours. A solution was prepared by mixing the fluorinated (meth) acrylate polymer of the invention with butyl acetate to provide a concentration of approximately 0.8% fluorine by weight. A ½-inch (1.3 cm) paintbrush was used to apply the solution to samples of each substrate surface to achieve 200 grams of copolymer per square meter of tile. The surface was then allowed to dry overnight at ambient temperature, approximately 20° C. to 25° C.

Leather: The fluorinated methacrylate copolymers of the invention was dissolved in a mixture of approximately 1:1 weight ratio of butyl acetate and heptane to achieve 0.4 weight % fluorine in solution. Two grams of the solution was spray applied to a 4"×4" (10 cm square) sample of tanned bovine leather, and dried for 24 hours under ambient conditions.

Paper: Waterleaf paper was immersed in a solution of the fluorinated (meth)acrylate polymer emulsions of the invention and water, then passed between squeeze rolls at achieve a wet pick up of approximately 150 weight %, and then dried/cured until the paper reached a temperature of at least 150° C. for 90 seconds followed by cooling to room temperature overnight. The goal fluorine level of micrograms of fluorine per gram of paper determined the concentration of the fluorinated (meth)acrylate polymer emulsion of the invention in the aqueous pad bath mixture.

Test Methods

Test Method 1—Wicking Release Test for Fabric

For the wicking testing, 5 drops of deionized water were placed on the fabric samples on different areas of the material. The time (in seconds) it took to completely absorb into the fabric was measured. If the drop had not been absorbed within 180 seconds, a value of 180+ was recorded. The wicking time is an indication of hydrophilicity or hydrophobicity. A faster wicking time indicates higher hydrophilicity, and a slower wicking time indicates higher hydrophobicity.

Test Method 2—Stain Release Test for Fabric

The stain release test was taken from the AATCC Test Method 130-1995. Five drops of either mineral oil or corn oil were placed in the center of each fabric sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The fabric samples were placed in a Kenmore washing machine with the following settings of Large load, Warm (100° F., 38° C.)/Cold, One rinse, Ultra Clean (setting 12), and Normal (fast/slow). 100 g of MTCC WOB detergent and 4 lbs. of material including ballasts were added to the wash machine. After washing, the fabric samples were placed in the Kenmore dryer on the high setting for 45 minutes. The fabric samples were rated based on the Stain Release Replica Grades below.

| Stain Release Grades | |
|---|---|
| Grade 5 | Stain equivalent to Standard Stain 5 |
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represented complete stain removal (best) and Grade 1 represented essentially no stain removal (poor).

Test Method 3—Water Repellency Test

The water repellency of a substrate (textile fabric, leather, carpet, etc.) was measured according to AATCC standard Test Method No. 193-2004 and the DuPont Technical Laboratory Method as outlined in the TEFLON Global Specifications and Quality Control Tests information packet. The test determines the resistance of a substrate to wetting by aqueous liquids. Drops of water-alcohol mixtures of varying surface tensions are placed on the substrate and the extent of surface wetting is determined visually.

The composition of water repellency test liquids is shown in Table 1.

TABLE 1

| Water Repellency Rating Number | Composition, Volume % Isopropyl Alcohol | Composition, Volume % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Three drops of Test Liquid 1 are placed on the substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater water repellency.

Test Method 4—Oil Repellency Test

The oil repellency of a substrate (textile fabric, leather, carpet, etc.) was tested using a modification of AATCC standard Test Method No. 118, conducted as follows. A substrate is maintained for a minimum of 2 hours at 23° C.+20% relative humidity and 65° C.+10% relative humidity. A series of organic liquids, identified below in Table 2, are then applied dropwise to the substrate. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs. The oil repellency rating is the highest numbered test liquid for which two of the three drops remained spherical to hemispherical, with no wicking for 30 seconds. Higher scores indicate greater oil repellency.

TABLE 2

| Oil Repellency Test Liquids | |
|---|---|
| Oil Repellency Rating Number | Test Solution |
| 1 | NUJOL Purified Mineral Oil |
| 2 | 65/35 Nujol/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Sayboltviscosity of 360/390 at 38° C. and a specific gravity of 0.880/0.900 at 15° C.

Test Method 5—Accelerated Carpet Soiling Test

A drum mill (on rollers) was used to tumble synthetic soil onto carpet samples. Synthetic soil was prepared as described in MTCC Test Method 123-2000, Section 8. Soil-coated beads were prepared as follows. Synthetic soil, 3 g, and 1 liter of clean nylon resin beads (SURLYN ionomer resin beads ⅛-³⁄₁₆ inch (0.32-0.48 cm) diameter were placed into a clean, empty canister. SURLYN is an ethylene/methacrylic acid copolymer, available from E. I. du Pont de Nemours and Company, Wilmington Del.). The canister lid was closed and sealed with duct tape and the canister rotated on rollers for 5 minutes. The soil-coated beads were removed from the canister.

Carpet samples to insert into the drum were prepared as follows. The carpet material used was a commercial tufted loop pile 28 oz/yd$^2$ (0.95 kg/m$^2$), dyed pale yellow and available from Invista Laboratories, Dalton, Ga. Total carpet sample size was 8×25 inches (20.3×63.5 cm) for these tests. One test sample and one control sample were tested at the same time. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings (⁵⁄₁₆ inch, 0.79 cm diameter) were placed into the drum mill. The drum mill lid was closed and sealed with duct tape. The drum was run on the rollers for 2½ minutes at 105 rpm. The rollers were stopped and the direction of the drum mill reversed. The drum was run on the rollers for an additional 2½ minutes at 105 rpm. The carpet samples were removed and vacuumed uniformly to remove excess dirt. The soil-coated beads were discarded. The Delta E color difference for the soiled carpet was measured for the test and control items versus the original unsoiled carpet. Color measurement of each carpet was conducted on the carpet following the accelerated soiling test. For each control and test sample the color of the carpet was measured, the sample was soiled, and the color of the soiled carpet was measured. The Delta E is the difference between the color of the soiled and unsoiled samples, expressed as a positive number. The color difference was measured on each item, using a Minolta Chroma Meter CR-310. Color readings were taken at five different areas on the carpet sample, and the average Delta E was recorded. The control carpet for each test item was of the same color and construction as the test item. The control carpet had not been treated with any fluorochemical. The surface effects on carpet including soil resistance and/or soil release are measured by the percentage of soil blocked. The percentage of soil blocked after drum soil as "% Cleaner than untreated" was calculated by following calculations:

% Cleaner than untreated=[(Delta $E$ of soiled untreated carpet)−(Delta $E$ of soiled treated carpet)]×100%    (Delta E of Soiled Untreated Carpet)

Use of this value corrects for different carpet color and construction, and permits meaningful comparisons between data sets. A higher percentage indicates superior soil resistance.

Test Method 6—Wash Durability for Textiles

The textile fabric samples were washed following the washing procedure of International Standard for textile testing. Fabric samples are loaded into a horizontal drum, front-loading type (Type A, WASICATOR Fom71MP-Lab) of automatic washing machine with a ballast load to give a total dry load of 4 lb. A commercial detergent is added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast are washed a designated number of times (5HW for 5 washes, 20HW for 20 washes, etc.). After washing, the samples were placed in a Kenmore dryer on the high setting for 45 minutes. After the specified number of laundry cycles, the repellency or stain release testing was repeated as described earlier.

Test Method 7—Penetration by Water (Spray Impact Test)

The nonwoven fabrics were tested for penetration by water using the INDA Standard Test Method for Penetration by Water (Spray Impact Test) of Nonwoven Fabrics 80.3-92. This method measures the resistance of nonwoven fabrics to the penetration of water by impact and can be used to predict the probable rain penetration resistance of the nonwoven fabric. The nonwoven fabric was used as protective barrier covering a sheet of preweighed, absorbent blotting paper (conforming to US Federal Specification NNN-P-035, available from AATCC, Research Triangle Park, N.C. 27709). The specified volume of deionized water (500 mL, 27+/−1° C.) was gravity fed through a spray nozzle onto a 45 degree inclined sample centered 24 inches (60.7 cm) below the spray nozzle. The difference in the weight of the nonwoven fabric before and after the spray procedure is a measure of the amount of water passing through the nonwoven fabric barrier. The greater the difference, the more water that has passed through; i.e., the less water repellent the fabric. Thus, smaller numbers indicate a better barrier to water spray and better water repellency.

Test Method 8—Determination of Stain Resistance on Tile

The following stains were placed on the surface of the tile to create a stain approximately 1 inch (2.5 cm) in diameter, with at least 1 inch (2.5 cm) separating the stains: 1) bacon grease, 2), salad dressing, 3) ketchup, 4) lemon juice, 5) canola oil and 6) motor oil. After 24-hour, the stains were blotted or lightly scraped from the tile surface. The tile's surface was rinsed with water and a 1% soap solution, and a stiff bristle brush was used to scrub the tile 10 cycles back and forth. The tile were then rinsed with water and allowed to dry for 24 hours before rating. The stains remaining on the tile surfaces after cleaning were rated visually according to a scale of 0 to 4 as follows: 0=no stain; 1=very light stain; 2=light stain; 3=moderate stain; and 4=heavy stain. Lower stain ratings indicate better stain protection, with zero indicating the best protection, i.e. with no stain present.

Test Method 9—Oil Repellency for Paper

The oil repellency of paper was tested following the TAPPI 557 method using 16 solutions in the kit test that have different concentrations of castor oil, toluene, and n-heptane. The solutions discriminate the various oleo-repellent treatment levels and therefore can be used to assign respective kit test values that are essentially a function of the surface tension which ranges from 34.5 dyne/cm of the solution 1, to 22 dyne/cm of the solution 12, to 20.3 dyne/cm of the solution 16. Animal or vegetable fats have a surface tension not lower than 24 dyne/cm which corresponds to a kit test value of about 7. A kit test value was assigned to the paper by means of the following procedure. A paper sample was placed on a clean flat, black-colored surface and a drop of the solution 1 is let fall thereon from a height of 22 mm (8.4 inches). The drop was left in contact with the paper for 15 seconds, and then removed by clean blotting paper, and the surface of the paper under the drop examined. If the surface of the paper under the drop did not appear dark, for instance, no halo observed, then the test was repeated using a solution having a lower surface tension (i.e. higher KIT value), until the presence of a dark halo was observed. Higher test values indicate a higher oil-repellency for the paper sample.

Test Method 10—Spray Repellency on Textile Fabrics

Water repellency can be further tested by utilizing the spray test method. The treated fabric samples were tested for water repellency by following the AATCC standard Test Method No. 22-1996, conducted as follows. A fabric sample, treated with an aqueous dispersion of polymer as previously described, is conditioned for a minimum of 2 hours at 23° C.+20% humidity and 65° C.+10% relative humidity. The fabric sample is securely fastened on a plastic/metal embroidery hoop such that the fabric is wrinkle-free. The hoop is placed on the testing stand so that the fabric is facing up. Then 250 mL of water at 80+−2° F. (27+−1° C.) is poured into the testing funnel allowing the water to spray onto the fabric surface. Once the water has run through the funnel, the hoop is rapped against the edge of a solid object with the fabric facing down, rotated 180 degrees and rapped again. The spotted or wetted surface is compared with the AATCC standards found in the AATCC Technical Manual. The more wet the surface, the lower the number and the poorer the repellency. A 100 denotes no wetting, a 90 denotes slight wetting (three small spots), an 80 denotes wetting signified by several (10) spots at the spray points, a 70 denotes partial wetting of the upper fabric surface, a 50 denotes wetting of the entire upper fabric surface, a 0 denotes complete wetting of the lower and upper fabric surface. Higher numbers indicate greater water repellency.

Test Method 11—Contact Angle Measurements

A 1% by weight solution of the polymer in tetrahydrofuran was dip coated onto MYLAR polyethylene terephthalate films (Du Pont Teijin Films, Hopewell, Va. 23860). The films were then air or vacuum dried for 24 h before measuring the contact angles. Contact angle (CA) measurements to determine the contact angle of both water and hexadecane on a surface were performed using a goniometer. Ramé-Hart Standard Automated Goniometer Model 200 employing DROPimage standard software and equipped with an automated dispensing system with 250 microliter syringe was used, having an illuminated specimen stage assembly. The goniometer camera was connected through an interface to a computer and this allowed the droplet to be visualized on a computer screen. The horizontal axis line and the cross line could both be independently adjusted on the computer screen using the software. Prior to contact angle measurement, the sample was placed on the sample stage and the vertical vernier adjusted to align the horizontal line (axis) of the eye piece coincident to the horizontal plane of the sample, and the horizontal position of the stage relative to the eye piece positioned so as to view one side of the test fluid droplet interface region at the sample interface. To determine the contact angle of the test fluid on the sample, approximately one drop of test fluid was dispensed onto the sample using a 30 microliter pipette tip and an automated dispensing system to displace a calibrated amount of the test fluid. For water measurements deionized water was employed, and for oil measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is that angle determined immediately after dispensing the test fluid to the sample surface. Initial contact angles above 30 degrees are indicators of effective water and oil repellency. Contact angle can be measured after the droplet has been added to a surface (advancing contact angle, abbreviated "Adv CA") or after the droplet has been partially withdrawn from a surface (receding contact angle, abbreviated "Rec CA").

Materials

1) The textile fabrics (cotton, polyester, nylon) were purchased from Textile Innovators Corporation, 100 Forest Street, Windsor, N.C. 27983.

2) The SONTARA polyester-cellulosic nonwoven fabric, (74 g/m$^2$) was purchased from DuPont, Nashville, Tenn.

3) The unglazed Saltillo (i.e. sun-dried Mexican clay) tiles 12-inch square (30.5 cm$^2$) were purchased from Tile Market of Delaware, Wilmington, Del.

4) The commercial carpet was a dyed light yellow 28 oz./yd$^2$ (0.95 kg/m$^2$) tufted, loop pile carpet made from twisted, SUPERBA heatset, 1410 Invista fiber, from Invista Laboratories, Dalton, Ga.

5) The tanned bovine leather was purchased from Seidel Tanning Corporation, Milwaukee, Wis.

6) The waterleaf paper (30 pounds/3000 square feet or 15 kilograms/288 square meters) was made at the Western Michigan University paper laboratories in Kalamazoo, Mich.

| | Chemicals | |
|---|---|---|
| Descriptor | Generic name/structure | Source |
| AMPS | 2-acrylamido-2-methyl-1-propanesulfonic acid, | Sigma-Aldrich, Milwaukee, WI. |
| GMA | glycidyl methacrylate | Sigma-Aldrich, Milwaukee, WI. |
| HEMA | 2-hydroxyethyl methacrylate (98%) | Sigma-Aldrich, Milwaukee, WI. |
| SUPRALATE WAQE | sodium alkyl sulfate mixture | Witco Corporation, Greenwich, CN |
| VAZO 56 WSP | 2,2'-azobis(2-methylpropionamidine) dihydrochloride | E. I. du Pont de Nemours and Company, Wilmington, DE |
| VAZO 64 | 2,2'-azobisisobutyronitrile | E. I. du Pont de Nemours and Company, Wilmington, DE |
| VAZO 67 | 2,2'-azobis(2-methylbutyronitrile) | E. I. du Pont de Nemours and Company, Wilmington, DE |
| ZELEC TY R | antistatic agent | E. I. du Pont de Nemours and Company, Wilmington, DE |

-continued

Chemicals

| Descriptor | Generic name/structure | Source |
|---|---|---|
| VDC | Vinylidene chloride | Sigma-Aldrich, Milwaukee, WI. |
| DPG | dipropylene glycol | Sigma-Aldrich, Milwaukee, WI. |
| 2EHMA | 2-ethylhexyl methacrylate | Sigma-Aldrich, Milwaukee, WI. |
| STY | Styrene | Sigma-Aldrich, Milwaukee, WI. |
| EGDMA | Ethylene glycol dimethacrylate | Sigma-Aldrich, Milwaukee, WI. |
| StMA | Stearyl methacrylate | Sigma-Aldrich, Milwaukee, WI. |
| BLEMMER 350 | Poly(ethylene glycol)-350 monomethacrylate | NOF-America, White Plains, NY |
| HG | Hexylene glycol | Sigma-Aldrich, Milwaukee, WI. |
| DDM | Dodecyl mercaptan | Sigma-Aldrich, Milwaukee, WI. |
| MAM | N-methylol acrylamide (48 wt % in water) | Sigma-Aldrich, Milwaukee, WI. |
| ETHOQUAD 18-25 | Octadecylmethyl[polyoxyethylene (15)] ammonium chloride | Akzo-Nobel, Chicago, IL |
| BuOAc | Butyl acetate | Sigma-Aldrich, Milwaukee, WI. |
| ETHAL TDA5 | tridecanol-5EO ethoxylate | Ethox Chemicals, Greenville, SC |
| ALKANOL 6112 | Approximately 7 wt % Polyoxyethylene Sorbitan Monooleate, 50 wt % 1-Decanol, 43 wt % water | E. I. du Pont de Nemours and Company, Wilmington, DE |

Preparation of Intermediates and Monomers

The following intermediate compounds and monomers were used in the Examples herein.

Compound 1

1,1,2,2,5,5,6,6-octahydroperfluoro-1-iodooctane, and

Compound 2

1,1,2,2,5,5,6,6,9,9,10,10-dodecahydroperfluoro-1-iodododecane

A 400 mL shaker tube was charged with perfluoroethylethyl iodide (PFEEI) (45 g), VAZO 64 (1 g). After cool evacuation, ethylene (6 g) and tetrafluoroethylene (25 g) were added. The resulting mixture was heated to 80° C. for 20 hours. The unreacted iodide PFEEI was recovered by vacuum distillation at room temperature. The remaining solid was extracted with $CH_3CN$ (3×100 mL). The $CH_3CN$ extracts were concentrated and distilled at reduced pressure to give pure iodide 1,1,2,2,5,5,6,6-octahydroperfluoro-1-iodooctane. The solid remained after $CH_3CN$ extraction was extracted with warm tetrahydrofuran. The tetrahydrofuran extract was concentrated and dried to give pure 1,1,2,2,5,5,6,6,9,9,10,10-dodecahydroperfluoro-1-iodododecane. The solid remained after tetrahydrofuran extraction was mainly iodides $C_2F_5(CH_2CH_2CF_2CF_2)_nCH_2CH_2I$ (mainly n=3 and higher oligomers), which had very low solubility in common solvents. The products 1,1,2,2,5,5,6,6-octahydroperfluoro-1-iodooctane and 1,1,2,2,5,5,6,6,9,9,10,10-dodecahydroperfluoro-1-iodododecane were characterized by H NMR and F NMR as shown below:

1,1,2,2,5,5,6,6-octahydroperfluoro-1-iodooctane: mp 75-77° C.:

H NMR ($CDCl_3$) 2.33 (m, 4H), 2.68 (m, 2H), 3.24 (m, 2H) ppm.

F NMR ($CDCl_3$) −85.9 (s, 3F), −115.8 (m, 4F), −119.2 (m, 2F) ppm.

1,1,2,2,5,5,6,6,9,9,10,10-dodecahydroperfluoro-1-iodododecane: mp 125-8° C.:

H NMR (acetone-d6) 2.46 (m, 8H), 2.77 (m, 2H), 3.37 (m, 2H) ppm.

F NMR (acetone-d6) −86.7 (s, 3F), −117.1 (m, 6F), −117.3 (m, 2F), −119.5 (m, 2F) ppm.

Product 1

Mixture of Ethylene-Tetrafluoroethylene Iodides

A one gallon reactor was charged with perfluoroethylethyl iodide (PFEEI) (850 g). After cool evacuation, ethylene and tetrafluoroethylene in 27:73 ratio were added until pressure reached 60 psig ($413.7×10^3$ Pa). The reaction was then heated to 70° C. More ethylene and tetrafluoroethylene in 27:73 ratio were added until pressure reached 160 psig ($1103×10^3$ Pa). A lauroyl peroxide solution (4 g lauroyl peroxide in 150 g PFEEI) was added at 1 mL/min rate for 1 hour. Gas feed ratio was adjusted to 1:1 of ethylene and tetrafluoroethylene and the pressure maintained at 160 psig ($1103×10^3$ Pa). After about 67 g of ethylene was added, both ethylene and tetrafluoroethylene feeds were stopped. The reaction was heated at 70° C. for another 8 hours. The volatiles were removed by vacuum distillation at room temperature. A solid product (773 g) was obtained, which contained 1,1,2,2,5,5,6,6-octahydroperfluoro-1-iodooctane (Compound 1) and 1,1,2,2,5,5,6,6,9,9,10,10-dodecahydroperfluoro-1-iodododecane (Compound 2) as major components in about 2:1 ratio.

Compound 3

1,1,2,2,5,5,6,6-octahydroperfluoro-1-iododecane, and

Compound 4

1,1,2,2,5,5,6,6,9,9,10,10-dodecahydroperfluoro-1-iodotetradecane

A 400 mL shaker tube was charged with perfluorobutylethyl iodide (PFBEI) (75 g) and VAZO 64 (1.5 g). After cool evacuation, ethylene (6 g) and tetrafluoroethylene (25 g) were added. The resulting mixture was heated to 80° C. for 20 hours. Reaction mixtures from 10 identical runs were combined and the unreacted iodide PFBEI was recovered by vacuum distillation at room temperature. The remaining solid (648 g) was extracted with $CH_3CN$ (10×300 mL). The combined $CH_3CN$ extracts were concentrated and distilled at reduced pressure to give iodide 1,1,2,2,5,5,6,6-octahydroperfluoro-1-iododecane. The solid remained after $CH_3CN$ extraction was mainly 1,1,2,2,5,5,6,6,9,9,10,10-dodecahydroperfluoro-1-iodotetradecane and higher oligomers. The products 1,1,2,2,5,5,6,6-octahydroperfluoro-1-iododecane was characterized by H NMR and F NMR as shown below.

1,1,2,2,5,5,6,6-Octahydroperfluoro-1-iododecane: mp 72-74° C.:

H NMR ($CDCl_3$) 2.36 (m, 4H), 2.69 (m, 2H), 3.25 (m, 2H) ppm.

F NMR ($CDCl_3$) −81.5 (tt, J=10, 3 Hz, 3F), −115.3 (m, 2F), −115.7 (m, 4F), −124.7 (m, 2F), −126.4 (m, 2F) ppm.

Compound 5

1,2,2,5,5,6,6-octahydroperfluoro-1-octanol

A mixture of 1,1,2,2,5,5,6,6-octahydroperfluoro-1-iodooctane (Compound 1)(136.91 g, 248.88 mmol) and N-methylformamide (NMF) (273 mL) was heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 2.5 hours. The reaction mixture was washed with water (200 mL×2), diluted with dichloromethane (200 mL), dried over sodium sulfate overnight. The dichloromethane solution was concentrated and distilled at reduced pressure to give 1,1,2,2,5,5,6,6-octahydroperfluoro-1-octanol, 50.8 g. The product 1,1,2,2,5,5,6,6-octahydroperfluoro-1-octanol was characterized by H NMR and F NMR as shown below:

H NMR ($CDCl_3$) 1.51 (t, J=6 Hz, 1H), 2.34 (m, 6H), 2.47 (m, 2H), 3.97 (q, J=6 Hz, 2H) ppm. F NMR ($CDCl_3$) −85.9 (s, 3F), −114.1 (m, 2F), −116.0 (m, 2F), −119.2 (m, 2F) ppm.

Compound 6

1,1,2,2,5,5,6,6,9,9,10,10-dodecahydroperfluoro-1-dodecanol

A mixture of 1,1,2,2,5,5,6,6,9,9,10,10-dodecahydroperfluoro-1-iodododecane (Compound 2, 65.62 g) and N-methylformamide (135 mL) was heated to 150° C. for 4 hours. The reaction mixture was washed with water (about 1 L) to give a solid product. This solid product was added ethanol (150 mL) and concentrated hydrochloric acid (1 mL) to the solids and heated at reflux (about 85° C.) for 19 hours. The reaction mixture was poured into water (500 mL) and the resulting solid was washed with water (3×300 mL), dried on vacuum to give 1,1,2,2,5,5,6,6,9,9,10,10-dodecahydroperfluoro-1-dodecanol (50.8 g), yield 98%, mp 112-5° C. The product 1,1,2,2,5,5,6,6,9,9,10,10-dodecahydroperfluoro-1-dodecanol was characterized by H NMR and F NMR as shown below:

H NMR ($CDCl_3$) 1.52 (br s, 1H), 2.34 (m, 10H), 3.97 (q, J=6 Hz, 2H) ppm. F NMR ($CDCl_3$) −85.9 (s, 3F), −114.2 (m, 2F), −115.8 (m, 4F), −116.1 (m, 2F), −119.2 (m, 2F) ppm.

Product 2

Mixture of ethylene-tetrafluoroethylene Alcohols

A mixture of iodides (Product 1, 46.5 g) and N-methylformamide (NMF) (273 mL) was heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 24 hours. The reaction mixture was poured into water (300 mL). The solid was washed with water (2×75 mL) and dried under vacuum (2 torr) to give a solid, 26.5 g, which contained Compound 5 (1,2,2,5,5,6,6-octahydroperfluoro-1-octanol) and Compound 6 (1,1,2,2,5,5,6,6,9,9,10,10-dodecahydroperfluoro-1-dodecanol) as major components.

Compound 7

1,1,2,2,5,5,6,6-octahydroperfluorooctyl acrylate

A 100 mL flask was charged with 1,1,2,2,5,5,6,6-octahydroperfluorooctanol (Compound 5, 24.1 g), triethylamine (10.8 g), and tetrahydrofuran (10 mL). Acryloyl chloride (9.7 g) in tetrahydrofuran (10 mL) was added drop wise at about 10° C. Another 30 mL tetrahydrofuran was added and the resulting mixture was stirred at room temperature for 22 hours. The reaction mixture was poured into water (150 mL) and extracted with dichloromethane (300 mL). The dichloromethane extract was washed with water (4×100 mL) and neutralized, dried over anhydrous sodium sulfate and inhibitor (6.06 g of 1505 micrograms per gram 4-methoxyphenol in dichloromethane) was added. The solution was concentrated and distilled at reduced pressure to give 1,1,2,2,5,5,6,6-octahydroperfluorooctyl acrylate, 24.1 g, bp 31-50° C. at 15 torr, 84% yield. The product 1,1,2,2,5,5,6,6-octahydroperfluorooctyl acrylate was characterized by C NMR, H NMR and F NMR as shown below:

C NMR ($CDCl_3$) 22.0 (tt, J=28, 4 Hz), 23.2 (tt, J=23, 5 Hz), 29.6 (t, J=22 Hz), 57.1 (t, J=5 Hz), 115.1 (tq, J=253, 38 Hz), 118.00 (tt, J=253, 37 Hz), 118.03 (tt, J=250, 38 Hz), 119.0 (qt, J=285, Hz), 128.0, 131.4, 165.8 ppm. H NMR ($CDCl_3$) 2.34 (m, 4H), 2.47 (m, 2H), 4.45 (t, J=7 Hz, 2H), 5.86 (dd, J=10, 1.4, 1H), 6.12 (dd, J=17, 10, 1H), 6.43 (dd, J=17, 1.4, 1H) ppm. F NMR ($CDCl_3$) −85.9 (s, 3F), −114.4 (m, 2F), −115.9 (m, 2F), −119.2 (m, 2F) ppm.

Compound 8

1,1,2,2,5,5,6,6,9,9,10,10-dodecahydroperfluorododecyl acrylate

A 500 mL flask was charged with 1,1,2,2,5,5,6,6,9,9,10,10-dodecahydroperfluorododecanol (Compound 6, 33.9 g), triethylamine (10.7 g), and tetrahydrofuran (200 mL). Acryloyl chloride (9.5 g) in tetrahydrofuran (10 mL) was added drop wise at about 14° C. The resulting mixture was stirred at room temperature for 15 hours. The reaction mixture was distilled on vacuum to remove solvent. The resulting residue was extracted with ether (3×300 mL). The combined ether extracts were washed with water (2×150 mL), dried over $Na_2SO_4$, concentrated and dried on vacuum to give 8.95 g product. The ether extracted residue was mixed with acetone (400 mL) and passed through silica gel column (about 300 g silica gel). The column was rinsed with acetone (2×500 mL). The combined acetone solution was concentrated and dried on vacuum to give 22 g of product. The combined yield was 8.95 g+22 g=31.95 g, 84%, mp 78-79° C. The product 1,1,2,2,5,5,6,6,9,9,10,10-dodecahydroperfluorododecyl acrylate was characterized by H NMR and F NMR as shown below:

H NMR (acetone-d6) 2.49 (m, 10H), 4.45 (t, J=7 Hz, 2H), 5.92 (dd, J=10, 1.7, 1H), 6.15 (dd, J=17, 10, 1H), 6.38 (dd, J=17, 1.6, 1H) ppm.

F NMR (acetone-d6) −86.8 (s, 3F), −115.9 (m, 2F), −117.1 (4F), −117.4 (2F), −119.6 (m, 2F) ppm.

Product 3

Mixture of Ethylene-Tetrafluoroethylene Acrylates

A 500 mL flask was charged with a mixture of alcohols (Product 2, 24.5 g), triethylamine (9.8 g), and tetrahydrofuran (100 mL). Acryloyl chloride (8.8 g) in tetrahydrofuran (10 mL) was added drop wise at about 10° C. Another 40 mL tetrahydrofuran was added and the resulting mixture was stirred at room temperature for 15 hours, 30° C. for 2 hours. The solid was removed by filtration and washed with tetrahydrofuran (50 mL). The combined filtrate and washer were concentrated to give a residue. The residue was mixed with ether (600 mL) and ether insoluble solids were removed by filtration. The ether solution was then washed with $NaHCO_3$ to almost neutral then water (3×50 mL), NaCl (sat.), dried over anhydrous $Na_2SO_4$, concentrated and dried on vacuum to solid product 19.8 g, which contained Compound 7 (1,1,2,2,5,5,6,6-octahydroperfluorooctyl acrylate) and Compound 8 (1,1,2,2,5,5,6,6,9,9,10,10-dodecahydroperfluorododecyl acrylate) as major components.

Compound 9

1,1,2,2,5,5,6,6-octahydroperfluorooctyl methacrylate

A 100 mL flask was charged with 1,1,2,2,5,5,6,6-octahydroperfluorooctanol (Compound 3, 2.5 g), triethylamine (1.2 g), and tetrahydrofuran (10 mL). Methacryloyl chloride (1.2 g), in tetrahydrofuran (6 mL) was added drop-wise at about 10° C. Another 30 mL of tetrahydrofuran was added and the resulting mixture was stirred at room temperature for 18 hours. The reaction mixture was poured into water (50 mL) and extracted with dichloromethane (3×50 mL). The dichloromethane extract was washed with water until neutral, dried over anhydrous sodium sulfate and added inhibitor (0.154 g of 1505 ppm 4-methoxyphenol in dichloromethane). The solution was concentrated and dried on vacuum to give a wax product, 2.86 g, 93% yield. The product 1,1,2,2,5,5,6,6-octahydroperfluorooctyl methacrylate was characterized by H NMR and F NMR as shown below:

H NMR (CDCl3) 1.95 (m, 3H), 2.34 (m, 4H), 2.46 (m, 2H), 4.44 (t, J=7 Hz, 2H), 5.59 (m, 1H), 6.13 (m, 1H) ppm. F NMR ($CDCl_3$) −85.9 (s, 3F), −114.4 (m, 2F), −115.9 (m, 4F), −119.2 (m, 2F) ppm.

Compound 10

1,1,2,2,5,5,6,6,9,9,10,10-dodecahydroperfluorododecyl methacrylate

A 500 mL flask was charged 1,1,2,2,5,5,6,6,9,9,10,10-dodecahydroperfluoro-1-dodecanol (Compound 4, 25.5 g), triethylamine (8.0 g), and tetrahydrofuran (170 mL), The mixture was heated to 50° C. to dissolve all solids, then cooled to about 35° C. A methacryloyl chloride (8.3 g) solution in tetrahydrofuran (30 mL) was added drop-wise with stirring (250 rpm) over a 2-hour period at 35° C. The reaction mixture was then stirred at 25-30° C. for 4-hours and at 35° C. for 1 hour. The volatiles were removed by vacuum distillation at room temperature to afford a residue. The residue was washed with water (2×400 mL), dried on vacuum to give a solid product, 1,1,2,2,5,5,6,6,9,9,10,10-dodecahydroperfluorododecyl methacrylate, 27.1 g, 91% yield, mp, 79-81° C. The product was characterized by H NMR and F NMR as shown below. H NMR (CDCl3) 1.95 (m, 3H), 2.34 (m, 8H), 2.46 (tt, J=18, 7 Hz, 2H), 4.44 (t, J=7 Hz, 2H), 5.59 (m, 1H), 6.13 (m, 1H) ppm. F NMR ($CDCl_3$) −85.9 (s, 3F), −114.5 (m, 2F), −115.8 (m, 4F), −116.0 (m, 2F), −119.2 (m, 2F) ppm.

Compound 11

1,1,2,2,5,5,6,6-octahydroperfluoro-1-decanol (Oleum Method)

A mixture of 1,1,2,2,5,5,6,6-octahydroperfluoro-1-iododecane (Compound 3, 12 g) and oleum (15% $SO_3$, 125 mL) was heated to 60° C. for 2 h. A $Na_2SO_3$ solution (4 g, in water 100 mL) was slowly added to the reaction mixture at 60° C. bath between 65 to 90° C. internal temperatures. The resulting mixture was heated to 90° C. for 30 min. After being cooled to room temperature, a solid was precipitated. The liquid was decanted and the solid was dissolved in ether (150 mL) and washed with $Na_2SO_3$ (1 M, 20 mL), water (2×20 mL), NaCl (sat. 20 mL), dried over anhydrous $Na_2SO_4$, concentrated and dried on vacuum to give to give a residue which was further purified by distillation to give an off-white solid 1,1,2,2,5,5,6,6-octahydroperfluoro-1-decanol, 6.2 g, bp, 65-79° C. at 2 torr as 1,1,2,2,5,5,6,6-octahydroperfluoro-1-decanol. The product was characterized by MS, H NMR and F NMR as shown below.

MS (m/e) 392 (M+, 0.16%), 372 (3.3%), 342 (60%), 323 (53%), 223 (29%), 95 (100%). H NMR (CDCl3) 1.58 (s, 1H), 2.36 (m, 6H), 3.97 (t, J=7 Hz, 2H) ppm. F NMR ($CDCl_3$) −81.5 (tt, J=9.5, 3 Hz, 3F), −114.1 (m, 2F), −115.4 (m, 2F), −116.0 (m, 2F), −124.8 (m, 2F), −126.4 (m, 2F) ppm.

Compound 11

1,1,2,2,5,5,6,6-octahydroperfluoro-1-decanol (NMF Method)

A 1 L flask was charged 1,1,2,2,5,5,6,6-octahydroperfluoro-1-iododecane (Compound 3, 135.3 g) and N-methylformamide (250 mL). The mixture was heated to 150° C. for 15 hours. After the reaction mixture was cooled to room temperature, water (600 mL) was added and stirred for several minutes. The bottom layer was isolated and washed with water (3×800 mL). Ethanol (290 mL) and concentrated hydrochloric acid (about 1 mL) were then added. The mixture was heated at reflux for 22 hours. The ethanol was removed by distillation. The residue was then washed with water (3×100 mL). Dichloromethane (250 mL) was added and the resulting solution was washed again with water (2×100 mL) then neutralize with an aqueous solution of sodium carbonate to pH~7. The dichloromethane solution was dried with anhydrous sodium sulfate, concentrated and further purified by distillation at reduced pressure to give a white solid, 1,1,2,2,5,5,6,6-octahydroperfluoro-1-decanol, 60.2 g.

Compound 12

1,1,2,2,5,5,6,6-octahydroperfluorodecyl methacrylate

A 100 mL flask was charged with 1,1,2,2,5,5,6,6-octahydro-perfluorodecanol (Compound 11, 5.4 g), triethylamine (1.8 g), and tetrahydrofuran (20 mL). Methacryloyl chloride (1.7 g) in tetrahydrofuran (2 mL) was added drop-wise at room temperature. The resulting mixture was stirred at room temperature for 15 hours. The resulting solid was removed by filtration and washed with ether (2×50 mL). The combined filtrate and washers were washed with water (2×10 mL), HCl (0.05N, 10 mL), water (10 mL), NaCl (sat. 10 mL), concentrated and dried on vacuum to give oil 5.75 g, 91% yield. The product 1,1,2,2,5,5,6,6-octahydroperfluorodecyl methacrylate was characterized by H NMR and F NMR as shown below.

MS (m/e) 460 (M+, 15%), 445 (0.3%), 375 (0.1%), 335 (5.7%), 277 (2.4%), 95 (100%). NMR H NMR (CDCl$_3$) 1.87 (s, 3H), 2.31 (m, 6H), 4.36 (t, J=7 Hz, 2H), 5.52 (m, 1H), 6.05 (m, 1H) ppm. F NMR (CDCl$_3$) −81.6 (tt, J=10, 3 Hz, 3F), −114.5 (m, 2F), −115.5 (m, 2F), −116.0 (m, 2F), −124.8 (m, 2F), −126.5 (m, 2F) ppm.

Product 4. Mixture of Ethylene-Tetrafluoroethylene Amines [F(CF$_2$CF$_2$CH$_2$CH$_2$)$_n$NH$_2$]

A mixture of iodides (Product 1, 10 g) was added to a solution of sodium azide (2.03 g) in acetonitrile (90 mL)-water (34 mL). The mixture was allowed to heat at 90° C. until the reaction was determined complete by gas chromatography. By 36 h complete conversion of the iodide to azide was observed. The mixture was cooled to room temperature and the bulk of the acetonitrile was evaporated under vacuum. The resulting slurry was extracted with methylene chloride (3×60 mL). The organic layer washed with water (2×80 mL), brine (1×80 mL) and dried over anhy. MgSO$_4$. Evaporation of the solvent and vacuum drying provided the oligomer azide F(CF$_2$CF$_2$CH$_2$CH$_2$)$_n$N$_3$ as a white solid. Oligomer azide, F(CF$_2$CF$_2$CH$_2$CH$_2$)N$_3$ (wherein n=2,3 were major components in about 2:1 ratio) (2.25 g) and Ni-Raney (0.032 g) were added to a solution of ethanol (5 mL) and water (5 mL). To the stirring mixture was slowly added hydrazine hydrate (0.328 g). After the addition was complete, the mixture was progressively heated to 60° C. and stirred at 60° C. for 12 h. The reaction mixture was cooled to room temperature and methylene chloride (30 mL) was added and stirred for 10 minutes. The resulting mixture was filtered and washed with water (2×20 mL) and brine (1×20 mL). Evaporation of the solvent followed by recrystallization from methylene chloride/hexane provided Product 4 [F(CF$_2$CF$_2$CH$_2$CH$_2$)$_n$NH$_2$] as a light brown solid (1.9 g). GC: 2 major Peaks correspond to n=2 and n=3 amines (~2:1 ratio).

$^1$H NMR (CDCl$_3$): δ 3.05 (bt, J=6.0 Hz, NH$_2$—CH$_2$), 2.29 (bm, CF$_2$—CH$_2$'s)

Product 5
Mixture of Thiol Derivative Oligomer Alcohols [F(CF$_2$CF$_2$CH$_2$CH$_2$)$_n$SCH$_2$CH$_2$OH]

To a solution of 2-mercaptoethanol (1.41 g) and sodium hydroxide (0.720 g) in tert-butanol (10 mL) heated to 80° C., was slowly added a mixture of iodides (Product 1, 5 g), The mixture was allowed to heat at 80° C. for 12 h and the reaction was determined complete by gas chromatography. The mixture was cooled to room temperature and the precipitated product was filtered and washed repeatedly with cold water followed by a mixture of 1:1 methylene chloride and hexane. The yellowish white solid was dried under vacuum to obtain the alcohol as a mixture of oligomers [F(CF$_2$CF$_2$CH$_2$CH$_2$)$_n$SCH$_2$CH$_2$OH] (Product 5) (3.4 g). GC-MS: 2 major peaks correspond to n=2 [(m/e) 352] and n=3 alcohols [(m/e) 480] in about a 2:1 ratio:

Product 6
Mixture of Thiol Derivative Oligomer Amines [F(CF$_2$CF$_2$CH$_2$CH$_2$)$_n$SCH$_2$CH$_2$NH$_2$]

To a solution of 2-aminoethanethiol (1.39 g) and sodium hydroxide (0.720 g) in tert-butanol (10 mL)heated to 80° C. was slowly added a mixture of iodides (Product 1, 5 g), The mixture was allowed to heat at 80° C. for 12 h and the reaction was determined complete by gas chromatography. The mixture was cooled to room temperature and the precipitated product was filtered and washed repeatedly with cold water followed by a mixture of 1:1 methylene chloride and hexane. The white solid was dried under vacuum to obtain the amines [F(CF$_2$CF$_2$CH$_2$CH$_2$)$_n$SCH$_2$CH$_2$NH$_2$] (Product 6) as a mixture of oligomers (3.9 g). GC-MS: 2 major peaks correspond to n=2 [(m/e) 351] and n=3 amines [(m/e) 479] in about a 2:1 ratio.

Product 7
Mixture of Oligomer Acryloyl Amide [F(CF$_2$CF$_2$CH$_2$CH$_2$)$_n$NHC(O)C(Me)=CH$_2$]

To a mixture of oligomer amine (Product 4) [F(CF$_2$CF$_2$CH$_2$CH$_2$)$_n$NH$_2$] (wherein n=2,3 were major components in about 2:1 ratio) (1.0 g) and triethylamine (0.220 g) in methylene chloride (20 mL) kept at 0° C. was added drop wise a solution of methacryloyl chloride (0.228 g) in methylene chloride (10 mL). The reaction mixture was stirred 8 h at room temperature. Water (20 mL) was added to the reaction mixture and the organic layer separated and washed with 1 N HCl (2×20 mL), sat. NaHCO$_3$ (2×20 mL) and brine (1×20 mL). The organic layer was separated and dried over anhydrous MgSO$_4$. Removal of the solvent under reduced pressure followed by repeated washing of the solid product with a mixture of cold methylene chloride and hexane (1:4) produced oligomer acrylamide [F(CF$_2$CF$_2$CH$_2$CH$_2$)$_n$NHC(O)C(Me)=CH$_2$] (Product 7) as a white solid (0.7 g).

$^1$H NMR (CDCl$_3$): δ 5.9 (bs, NH), 5.60 (d, J=1.0 Hz, =CH), 5.28 (q, J=1.2 Hz, =CH), 3.58 (q, J=6.0 Hz, NCH$_2$), 2.25 (bm, CF$_2$CH$_2$'s), 1.89 (t, J=1.2 Hz, CH$_3$).

Compound 13
Urethane Acrylate
[F(CF$_2$CF$_2$CH$_2$CH$_2$)$_2$OC(O)NHCH$_2$CH$_2$OC(O)C(Me)=CH$_2$]

To a solution of 1,1,2,2,5,5,6,6-octahydroperfluoro-1-octanol (Compound 5) (1.5 g) in methylene chloride (20 mL) kept at 0° C. was added 2-isocyanatoethylmethacrylate (0.724 g) and catalytic dibutyltindilaurate (0.01 g). The mixture was stirred at room temperature for 12 h. The solvents were stripped off under vacuum and the resulting gummy solid was washed repeatedly with cold hexane-methylene chloride:mixture (4:1). The product was then dried under vacuum to obtain the urethane acrylate [F(CF$_2$CF$_2$CH$_2$CH$_2$)$_2$OC(O)NHCH$_2$CH$_2$OC(O)C(Me)=CH$_2$](Compound 13) as a white solid (2.1 g).

$^1$H NMR (CDCl$_3$): δ 6.14 (t, J=1.0 Hz, 1H), 5.62 (q, J=2.0 Hz, 1H), 5.00 (bs, 1H), 4.38 (t, J=7.0 Hz, 2H), 4.26 (t, J=5.8 Hz, 2H), 3.54 (q, J=6 Hz, 2H), 2.37 (m, 6H), 1.97 (q, J=1 Hz, 3H): $^{19}$F NMR (CDCl3): δ −86.3 (m, 3F), −113.3 (m, 2F), −115.0 (m, 2F), −120.1 (m, 2F).

Product 8
Mixture of Oligomer Urea Acrylate
[F(CF$_2$CF$_2$CH$_2$CH$_2$)$_n$NHC(O)NHCH$_2$CH$_2$OC(O)C(Me)=CH$_2$]

To a mixture of oligomeric amine (Product 4) [F(CF$_2$CF$_2$CH$_2$CH$_2$)$_n$NH$_2$] (wherein n=2,3 were major components in about a 2:1 ratio) (0.5 g) in methylene chloride (15 mL) kept at 0° C. was added 2-isocyanatoethylmethacrylate (0.163 g) and the mixture was stirred at room temperature for 12 h. The precipitated solid was filtered of, washed repeatedly with cold hexane-methylene chloride mixture (3:1). The product was then dried under vacuum to obtain the oligomeric urea acrylates [F(CF$_2$CF$_2$CH$_2$CH$_2$)$_2$OC(O)NHCH$_2$CH$_2$OC(O)C(Me)=CH$_2$] (Product 8) as a white solid (0.48 g).

$^1$H NMR (CDCl$_3$): δ 6.04 (t, J=1.6 Hz, =CH), 5.52 (quintet, J=1 Hz, =CH), 4.56 (bs, NH), 4.16 (t, J=6.0 Hz, OCH$_2$), 3.46 (2 merging q, J=5.6 Hz, NHCH$_2$), 2.24 (bm, CF$_2$CH$_2$'s), 1.87 (t, J=1.2 Hz, CH$_3$).

Product 9
Mixture of Ethylene-Tetrafluoroethylene Methacrylates

A 500 mL flask was charged with a mixture of alcohols (Product 2, 24.5 g), triethylamine (9.8 g), and tetrahydrofuran (100 mL). Methacryloyl chloride (10.2 g) in tetrahydrofuran (10 mL) was added drop wise at about 10° C. Another 40 mL tetrahydrofuran was added and the resulting mixture was stirred at room temperature for about 15 hours, then at 30° C. for 2 hours. The solid was removed by filtration and washed with tetrahydrofuran (50 mL). The combined filtrate and washer were concentrated to give a residue. The residue was mixed with ether (600 mL) and ether insoluble solids were removed by filtration. The ether solution was then washed with NaHCO₃ to almost neutral then water (3×50 mL), NaCl (sat.), dried over anhydrous Na₂SO₄, concentrated and dried on vacuum to obtain a solid product of about 20 g, which contained Compound 9 (1,1,2,2,5,5,6,6-octahydroperfluorooctyl methacrylate) and Compound 10 (1,1,2,2,5,5,6,6,9,9,10,10-dodecahydroperfluorododecyl methacrylate) as major components.

Product 10
Mixture of Thiol Derivative Oligomer Acrylates

To a mixture of oligomer alcohols (Product 5) [F(CF₂CF₂CH₂CH₂)$_n$SCH₂CH₂OH] (wherein n=2,3 were major components in about 2:1 ratio) (0.700 g) and triethylamine (0.166 g) in methylene chloride (20 mL) kept at 0° C. was added drop wise a solution of methacryloyl chloride (0.172 g) in methylene chloride (10 mL). The reaction mixture was stirred 12 h at room temperature. Water (20 mL) was added to the reaction mixture and the organic layer separated and washed with 1 N HCl (2×20 mL), sat. NaHCO₃ (2×20 mL) and brine (1×20 mL). The organic layer was separated and dried over anhydrous MgSO₄. Removal of the solvent under reduced pressure followed by repeated washing of the solid product with a mixture of cold methylene chloride and hexane (1:4) produced thiol derivative oligomer acrylate [F(CF₂CF₂CH₂CH₂)$_n$SCH₂CH₂OC(O)C(Me)=CH₂] (Product 10) as a white solid (0.42 g).

$^1$H NMR (CDCl₃): δ 6.1 (t, J=1.0 Hz, =CH), 5.62 (t, J=1.6 Hz, =CH), 4.36 (t, J=6.8 Hz, OCH₂), 2.85 (t, J=6.8 Hz, SCH₂), 2.81 (m, SCH₂), 2.35 (bm, CF₂CH₂'s), 1.98 (t, J=1.2 Hz, CH₃).

Product 11
Mixture of Thiol Derivative Oligomer Acryloyl Amides

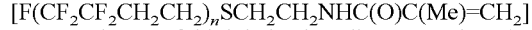

To a mixture of thiol derivative oligomer amines (Product 6) [F(CF₂CF₂CH₂CH₂)$_n$SCH₂CH₂NH₂] (wherein n=2,3 were major components in about a 2:1 ratio) (0.700 g) and triethylamine (0.166) in methylene chloride (20 mL) kept at 0° C. was added drop wise a solution of methacryloyl chloride (0.228 g) in methylene chloride (10 mL). The reaction mixture was stirred 8 h at room temperature. Water (20 mL) was added to the reaction mixture and the organic layer separated and washed with 1 N HCl (2×20 mL), sat. NaHCO₃ (2×20 mL) and brine (1×20 mL). The organic layer was separated and dried over anhydrous MgSO₄. Removal of the solvent under reduced pressure followed by repeated washing of the solid product with a mixture of cold methylene chloride and hexane (1:4) produced thiol derivative oligomer acryloyl amide [F(CF₂CF₂CH₂CH₂)$_n$SCH₂CH₂NHC(O)C(Me)=CH₂] (Product 11) as a white solid (0.530 g).

$^1$H NMR (CDCl₃): δ 6.2 (bs, NH), 5.79 (s, =CH), 5.38 (q, J=1.2 Hz, =CH), 3.56 (q, J=6.0 Hz, NCH₂), 2.79 (t, J=6.6 Hz, SCH₂), 2.77 (t, J=6.6 Hz, SCH₂), 2.37 (bm, CF₂CH₂'s), 2.0 (s, CH₃).

EXAMPLES

Example 1

A mixture of 1,1,2,2,5,5,6,6-octahydroperfluorooctyl methacrylate (Compound 9, 2.85 g), stearyl methacrylate (2.87 g), and 4-methyl-2-pentanone (60 mL) were heated to 76° C. 2,2'-Azobis(2,4-dimethylpentanenitrile) (35 mg) was then added to the reaction mixture. The resulting mixture was heated at 76° C. for 22 hours. A polymer solution was obtained, which was calculated to contain 2.41 w/w % F. The polymer was applied to cotton and nylon fabrics using the application method for Textile Fabrics (B) previously described. The fabrics were tested for water repellency using Test Method 3 and oil repellency using Test Method 4. The results are in Table 1.

Example 2

A mixture of acrylates (Product 3, 16.1 g), stearyl methacrylate (4.2 g), N-methylol acrylamide (48 wt % in water) (0.623 g), 2-hydroxyethyl methacrylate (98%) (0.25 g), 1-dodecanethiol (56 mg), water (37 mL), 7-EOMA poly(ethylene glycol) methacrylate having an average of 7 ethylene glycol units (0.34 g), TERGITOL 15-S-20 available from Union Carbide, a subsidiary of Dow Chemical Company, Houston, Tex., (2.14 g), dipropylene glycol (2.93 g), and ETHOQUAD 18/25 (Octadecylmethyl[polyoxyethylene (15) ammonium chloride) (0.74 g) was sonified to make an emulsion. A solution of VAZO-56WSP (0.15 g) in water (3.5 mL) was added to the emulsion. The resulting emulsion was heated in an oil bath (bathe temperature 55° C.) for 21 hours. The reaction mixture was determined to contain 35.9 w/w % solid product copolymer. The polymer was applied to cotton and nylon fabrics using the application method for Textile Fabrics (B) previously described. The fabrics were tested for water repellency using Test Method 3 and oil repellency using Test Method 4. The results are in Table 1.

Example 3

A mixture of 1,1,2,2,5,5,6,6-octahydroperfluorooctyl acrylate (Compound 7, 2 g), stearyl methacrylate (0.5 g), 2,2'-azobis(2,4-dimethylpentanenitrile) (0.1 g) and 4-methyl-2-pentanone (10 mL) were heated to 76° C. for 17 hours. The polymer solution was poured into methanol (40 mL). The precipitated polymer was washed with methanol and dried to give a polymer (1.1 g), which contained about 22% stearyl methacrylate monomer. The polymer was applied to cotton and nylon fabrics using the application method for textile Fabrics (B) previously described. The fabrics were tested for water repellency using Test Method 3 and oil repellency using Test Method 4. The results are in Table 1.

Example 4

A mixture of 1,1,2,2,5,5,6,6,9,9,10,10-dodecahydroperfluorododecyl acrylate (Compound 8, 1 g), stearyl methacrylate (0.7 g), 2,2'-azobis(2,4-dimethylpentanenitrile) (40 mg) and 4-methyl-2-pentanone (9 mL) were heated to 40° C. for 1 hour and 76° C. for 35 hours. A polymer solution was obtained, which was calculated to contain 5.2 w/w % F. The polymer was applied to cotton and nylon fabrics using the application method for textile Fabrics (B) previously described. The fabrics were tested for water repellency using Test Method 3 and oil repellency using Test Method 4. The results are in Table 1.

Example 5

A mixture of 1,1,2,2,5,5,6,6,9,9,10,10-dodecahydroperfluoro-dodecyl methacrylate (Compound 10, 1.0 g), stearyl methacrylate (0.69 g), VAZO 64 (25 mg), and methylisobutyl ketone (2.47 g) was heated to 65° C. for 15 hours. After being cooled to room temperature, a slightly viscous solution was obtained. This solution contained about 12.1 w/w % F. The product polymer was applied to cotton and nylon fabrics using the application method for textile Fabrics (B) previously described. The fabrics were tested for water repellency using Test Method 3 and oil repellency using Test Method 4. The results are in Table 1.

Example 6

A mixture of oligomeric acryloyl amide ([F$(CF_2CF_2CH_2CH_2)_n$NHC(O)C(Me)=CH$_2$]) (Product 7) (wherein n=2,3 were major components in about a 2:1 ratio) (0.5 g), stearyl methacrylate (0.317 g), and degassed methylethylketone (10 mL) were heated to 60° C. 2,2'-Azobis(2-methylbutyronitrile) (18 mg) was then added to the reaction mixture. The resulting mixture was heated at 70° C. for 20 hours. The reaction mixture was cooled and poured into cold methanol (15 mL). The solvent was decanted. The polymer was purified by dissolving in methylethylketone (5 mL) and precipitation by adding methanol. (10 mL) to obtain 0.302 g of co-polymer. The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

Example 7

A mixture of 1,1,2,2,5,5,6,6-octahydroperfluorooctyl urethane methacrylate [F(CF$_2$CF$_2$CH$_2$CH$_2$)$_2$OC(O)NH CH$_2$CH$_2$OC(O)C(Me)=CH$_2$] (Compound 13) (1.0 g), stearyl methacrylate (0.687 g), and methylethylketone (10 mL) were heated to 60° C. 2,2'-Azobis(2,4-dimethylpentanenitrile) (38 mg) was then added to the reaction mixture. The resulting mixture was heated at 70° C. for 20 hours. The reaction mixture was cooled and poured into cold methanol (15 mL). The solvent was decanted. The polymer was purified by redissolving in methylethylketone (8 mL) and reprecipitation by adding methanol (10 mL) to obtain 0.800 g of co-polymer. The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

Example 8

A mixture of oligomeric urea methacrylates [F(CF$_2$CF$_2$CH$_2$CH$_2$)$_2$NHC(O)NHCH$_2$CH$_2$OC(O)C(Me)=CH$_2$] (Product 8) (0.300 g), stearyl methacrylate (0.146 g), and methylethylketone (6 mL) were heated to 60° C. 2,2'-Azobis(2,4-dimethylpentanenitrile) (10 mg) was then added to the reaction mixture. The resulting mixture was heated at 70° C. for 20 hours. The reaction mixture was cooled and poured into cold methanol (10 mL). The solvent was decanted. The polymer was purified by redissolving in methylethylketone (6 mL) and reprecipitation by adding methanol (10 mL) to obtain 0.179 g of co-polymer. The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

Example 9

A mixture of oligomeric acrylate ([F(CF$_2$CF$_2$CH$_2$CH$_2$)$_n$SCH$_2$CH$_2$OC(O)C(Me)=CH$_2$]) (Product 10) (n=2,3 are major components in about 2:1 ratio) (0.120 g), stearyl methacrylate (0.070 g), and degassed methylethylketone (4 mL) were heated to 60° C. 2,2'-Azobis(2-methylbutyronitrile) (5 mg) was then added to the reaction mixture. The resulting mixture was heated at 70° C. for 20 hours. The reaction mixture was cooled and poured into cold methanol (6 mL). The solvent was decanted. The polymer was purified by dissolving in methylethylketone (3 mL) and precipitation by adding methanol (6 mL) to obtain 0.114 g of co-polymer. The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

Example 10

A mixture of oligomeric urea methacrylate (deleted octahydroperfluorooctyl urethane methacrylate) [F(CF$_2$CF$_2$CH$_2$CH$_2$)$_n$SCH$_2$CH$_2$NHC(O)C(Me)=CH$_2$] (Product 11) (0.200 g), stearyl methacrylate (0.117 g), and methylethylketone (6 mL) were heated to 60° C. 2,2'-Azobis (2,4-dimethylpentanenitrile) (7 mg) was then added to the reaction mixture. The resulting mixture was heated at 70° C. for 20 hours. The reaction mixture was cooled and poured into cold methanol (10 mL). The solvent was decanted. The polymer was purified by redissolving in methylethylketone (6 mL) and reprecipitation by adding methanol (10 mL) to obtain 0.210 g of co-polymer. The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

Comparative Example A

Under a nitrogen atmosphere charged a 20 ml vial with 1H,1H,2H,2H-perfluorooctylacrylate (2.0 g), obtained from SynQuest Fluorochemicals (Alachua, Fla.), stearyl methacrylate (1.2 g), tetrahydrofuran (8 mL), and 2,2'-azobis(2,4-dimethylpentanenitrile) (23 mg). The reaction was heated at 60° C. for 21 hrs. After being cooled to room temperature, the reaction mixture was poured into methanol (100 ml). The precipitated polymer was washed with methanol (20 ml) and dried on vacuum to give polymer (2.56 g). The polymer was applied to cotton and nylon fabrics using the application method for textile Fabrics (B) previously described. The fabrics were tested for water repellency using Test Method 3 and oil repellency using Test Method 4. The results are in Table 1. The polymer was applied to MYLAR polyethylene terephthalate film using the application method for nonwovens and contact angles were measured according to Test Method 11. Results are in Table 2.

TABLE 1

Water and Oil Repellency

| Polymer | Solvent* | Cotton Oil | Cotton Water | Nylon Oil | Nylon Water |
|---|---|---|---|---|---|
| Example 1 | MIBK | 0 | 0 | 0 | 4 |
| Example 2 | water (suspension) | 0 | 3 | 3 | 5 |
| Example 3 | MIBK | 0 | 4 | 2 | 5 |
| Example 4 | MIBK | 0 | 6 | 2 | 9 |
| Example 5 | MIBK | 1 | 6 | — | — |
| Example 6 | THF | 1 | 5 | | |
| Example 7 | THF | 2 | 7 | 2 | 7 |
| Example 8 | THF | 1 | 4 | | |
| Example 9 | THF | 2 | 5 | | |
| Example 10 | THF | 1 | 4 | | |
| Comparative Example A | THF | 0 | 0 | 0 | 4 |

*MIBK is methylisobutyl ketone, THF is tetrahydrofuran

The data in Table 1 demonstrates that the examples 1-10 generally imparted equivalent or superior water repellency and oil repellency versus comparative Example A.

TABLE 2

Contact Angles

| | Contact angle$^a$ | | | |
|---|---|---|---|---|
| | Water | | Hexadecane | |
| Polymer | Adv CA | Rec CA | Adv CA | Rec CA |
| Example 6 | 117 ± 2 | 80 ± 1 | 65 ± 2 | 19 ± 2 |
| Example 7 | 108 ± 1 | 43 ± 4 | 74 ± 1 | 24 ± 1 |
| Example 8 | 130 ± 1 | 56 ± 2 | 53 ± 2 | 21 ± 1 |
| Example 9 | 140 ± 1 | 64 ± 2 | 63 ± 2 | 36 ± 1 |
| Example 10 | 114 ± 4 | 57 ± 1 | 46 ± 1 | 20 ± 1 |
| Untreated MYLAR Polyethylene film | 85 ± 1 | 32 ± 3 | 25 ± 1 | 10 |

$^a$Average of 3 runs at different positions on each sample.
"Adv CA" means advancing contact angle;
"Rec CA" means receding contact angle.

The data in Table 2 demonstrates increased contact angle for Examples of the invention compared to untreated polyethylene film indicating enhanced repellency would exist for water and oil.

Example 11

1,1,2,2,5,5,6,6-Octahydroperfluorooctyl acrylate (Compound 7, 5.0 grams,), acrylamido methyl propyl sulfonic acid (AMPS) (2.15 grams), glycidyl methacrylate (GMA) (0.10 grams), dodecyl mercaptan (0.02 grams), sodium chloride (0.0125 grams), VAZO 67 (0.32 grams), and 100 mL of 2-propanol were combined in a multi-neck flask with condenser, nitrogen inlet-outlet, mechanical stirrer, and temperature probe, After stirring at room temperature and nitrogen purge/sparge for 30 minutes, all of the organic ingredients dissolved. The temperature was raised to 80° C. and maintained at 80° C.+/−5° C. for 16 hours under nitrogen blanket. Gas chromatography analysis of the reaction mixture showed that less than 5% of the monomers remained. Approximately 75 ml of 2-propanol was removed by reduced pressure distillation. After the reaction mixture was allowed to cool to room temperature, 50 mL deionized water and 0.25 grams of sodium bicarbonate were added. The pH was adjusted to about 8.5 with aqueous sodium bicarbonate. The remaining 2-propanol solvent was removed by reduced pressure evaporation. Additional water was added for a total of about 100 mL of aqueous solution of anionic, fluorinated polymer. The polymer was applied to commercial carpet using the application method previously described for carpet. The carpet was tested for soil resistance using Test Method 5. Results are in Table 3. The polymer was applied to cotton fabric using application method for Textile Fabrics (A). The fabric was tested for wicking and stain release and durability thereof using Test Methods 1, 2 and 6. Results are in Table 4.

TABLE 3

Soil resistance on Carpet

| | Example 11 | Untreated |
|---|---|---|
| Measured fluorine level, microgram/g | 360 | none |
| Delta E after soiling | 32.2 | 39.3 |
| % cleaner than untreated | 18% | 0% |

These results show that the fluorinated methacrylate copolymers of the invention provide effective dry soil resistance for carpeting.

TABLE 4

Stain Release on Cotton

| Stain release | Example 11 | Untreated |
|---|---|---|
| Initial (0 HW)* | | |
| Stain release - mineral oil | 4.5 | 2 |
| Stain release - corn oil | 4 | 3 |
| Wicking time | 0 seconds | 9 seconds |
| After 5 HW* | | |
| Stain release - mineral oil | 3.5 | 1 |
| Stain release - corn oil | 4 | 2 |
| Wicking time | 0 seconds | 9 seconds |

*After 0 and 5 washes per Test Method 6.

These results show that the fluorinated methacrylate copolymers of the invention provided effective wicking (hydrophilicity) and oily stain release for cotton textile fabrics.

Example 12

1,1,2,2,5,5,6,6,9,9,10,10-Dodecahydroperfluorododecyl acrylate (Compound 8) (2.41 grams), stearyl methacrylate (0.631 grams), ETHAL TDA-5 (0.280 grams), hexylene glycol (6.312 grams), hydroxyethyl ethacrylate (0.36 grams), poly(ethylene glycol) methacrylate having an average of 7 ethylene glycol units (0.70 grams), 45 weight % N-methylol acrylamide (0.70 grams), dodecyl mercaptan (0.017 grams), ETHOQUAD 18-25 (20% solution, 3.147 grams), 65.7 grams of deionized water, and 10 grams of butyl acetate were mixed and heated to 55° C. and emulsified in a sonicator twice for two minutes each until a uniform milky white emulsion resulted. The emulsion was charged to a flask equipped with nitrogen purging, a condenser, overhead stirrer and temperature probe, and stirred at 170 rpm and stirred for 30 minutes. When the temperature had dropped below about 30° C. the flask was switched to nitrogen blanket and vinylidene chloride (0.617 grams) was added. The solution was stirred for 15 minutes followed by addition of VAZO-56WSP initiator (0.035 g) in deionized water (25.0 g). The mixture was heated to 50° C. over 30 minutes and stirred for 8 hours at 50° C. Gas chromatography analysis of the reaction mixture showed that less than 5% of the monomers remained. The emulsion was cooled to ambient room temperature, and passed through a milk filter to provide an emulsion copolymer of ethylene tetrafluoroethylene acrylate/stearyl methacrylate/vinylidene chloride having 3.8% solids. The polymer was applied to polyester and nylon fabrics using application method Textile Fabrics (A) and to nonwoven fabric using the application method previously described. The polyester and nylon fabrics were tested for oil repellency, water repellency and spray repellency using Test Methods 3, 4 and 10. Results are in Table 5. The nonwoven was tested for water repellency and spray repellency using Test Methods 3 and 7. Results are in Table 6.

TABLE 5

|  | Example 12 | Untreated |
|---|---|---|
| Polyester fabric |  |  |
| Goal fluorine level, micrograms per gram | 2000 | none |
| Oil repellency | 5 | 0 |
| Water repellency | 8 | 0 |
| Spray repellency rating | 100 | 0 |
| Nylon fabric |  |  |
| Goal fluorine level, micrograms per gram | 2000 | none |
| Oil repellency | 6 | 0 |
| Water repellency | 9 | 0 |
| Spray repellency rating | 100 | 0 |

These results show that the fluorinated methacrylate copolymers of the invention provided excellent oil repellency, water repellency, and spray repellency for nylon and polyester textile fabrics.

TABLE 6

| SONTARA nonwoven fabric | | |
|---|---|---|
| polyester/cellulose | Example 12 | Untreated |
| Goal fluorine level, micrograms per gram | 2000 | none |
| Water repellency | 4 | 0 |
| Spray impact | 9.4 grams | 17.8 grams |

These results show that the fluorinated methacrylate copolymers of the invention provided effective water repellency and spray impact resistance for SONTARA nonwoven fabrics.

Example 13

A mixture of methacrylates (Product 9, 2.41 grams), stearyl methacrylate (0.99 grams), ETHAL TDA-5 (0.28 grams), hexylene glycol (6.312 grams), hydroxyethyl methacrylate (0.036 grams), polyethylene glycol methacrylate (BLEMMER PE-350, 0.070 grams), 45 weight % N-methylol acrylamide (0.070 grams), dodecyl mercaptan (0.017 grams), ETHOQUAD 18-25 (20% solution, 3.14 grams), and about 66 grams of deionized water were mixed and heated to 55° C. and emulsified in a sonicator twice for two minutes each until a uniform milky white emulsion resulted. The emulsion was charged to a flask equipped with nitrogen purging, a condenser, overhead stirrer and temperature probe, and stirred at 170 rpm for 30 minutes. When the temperature had dropped below about 30° C. the flask was switched to nitrogen blanket and vinylidene chloride (2.56 grams) was added. The solution was stirred for 15 minutes followed by addition of VAZO-56WSP initiator (0.035 g) in about 25 grams of deionized water. The mixture was heated to 50° C. over 30 minutes and stirred for 8 hours at 50° C. Gas chromatography analysis of the reaction mixture showed that less than 5% of the monomers remained. The emulsion was cooled to ambient room temperature, and passed through a milk filter resulting in an emulsion copolymer of ethylene tetrafluoroethylene methacrylate/stearyl methacrylate/vinylidene chloride having 4.1 weight % solids. The polymer was applied to polyester and nylon fabrics using application method Textile Fabrics (A). The polyester and nylon fabrics were tested for oil repellency, water repellency and spray repellency using Test Methods 3, 4 and 10. Results are in Table 7. The polymer was applied to SONTARA nonwoven using the application method previously described. The nonwoven was tested for water repellency and spray repellency using Test Methods 3 and 7. Results are in Table 8.

Example 14

An emulsion copolymer of ethylene-tetrafluoroethylene methacrylate/stearyl methacrylate/vinylidene chloride was prepared using the process of Example 13 using a mixture of methacrylates (Product 9, 2.92 grams), stearyl methacrylate (0.73 grams), and vinylidene chloride (0 grams), resulting in an emulsion copolymer having 3.9 weight % solids. The polymer was applied to polyester and nylon fabrics using application method Textile Fabrics (A). The polyester and nylon fabrics were tested for oil repellency, water repellency and spray repellency using Test Methods 3, 4 and 10. Results are in Table 7. The polymer was applied to SONTARA nonwoven using the application method previously described. The nonwoven was tested for water repellency and spray repellency using Test Methods 3 and 7. Results are in Table 8.

Example 15

An emulsion copolymer of ethylene-tetrafluoroethylene methacrylate/stearyl methacrylate/vinylidene chloride was prepared using the process of Example 13 using a mixture of methacrylates (Product 9, 2.41 grams), stearyl methacrylate (0.99 grams), and vinylidene chloride (0.26 grams), resulting in an emulsion copolymer having 3.9 weight % solids. The polymer was applied to polyester and nylon fabrics using application method Textile Fabrics (A). The polyester and nylon fabrics were tested for oil repellency, water repellency and spray repellency using Test Methods 3, 4 and 10. Results are in Table 7. The polymer was applied to SONTARA nonwoven using the application method previously described. The nonwoven was tested for water repellency and spray repellency using Test Methods 3 and 7. Results are in Table 8.

TABLE 7

| | Example 13 | Example 14 | Example 15 | Untreated |
|---|---|---|---|---|
| Polyester fabric | | | | |
| Goal fluorine level, micrograms per gram | 2000 | 2000 | 2000 | none |
| Oil repellency | 3 | 2 | 2 | 0 |
| Water repellency | 8 | 8 | 5 | 0 |
| Spray repellency rating | 80 | 80 | 70 | 0 |
| Nylon fabric | | | | |
| Goal fluorine level, micrograms per gram | 2000 | 2000 | 2000 | none |
| Water repellency | 5 | 4 | 4 | 0 |
| Spray repellency rating | 50 | 50 | 50 | 0 |

These results show that the fluorinated methacrylate copolymers of the invention provided excellent water repellency and spray repellency for nylon textile fabrics, and provided excellent oil repellency, water repellency, and spray repellency for polyester textile fabrics.

TABLE 8

SONTARA Nonwoven fabric

| polyester/cellulose | Example 13 | Example 14 | Example 15 | Untreated |
|---|---|---|---|---|
| Goal fluorine level, micrograms per gram | 2000 | 2000 | 2000 | none |
| Water repellency | 5 | 6 | 4 | 0 |
| Spray impact (grams) | 3.4 | 4.6 | 8.8 | 17.7 |

These results show that the fluorinated methacrylate copolymers of the invention provided effective water repellency and spray impact resistance for SONTARA nonwoven fabrics.

Example 16

An emulsion copolymer of ethylene-tetrafluoroethylene methacrylate/stearyl acrylate/vinylidene chloride was prepared using the process of Example 13 using a mixture of methacrylates (Product 9, 2.92 grams), stearyl acrylate (0.73 grams), and vinylidene chloride (0 grams), resulting in an emulsion copolymer having 4.3 weight % solids. The polymer was applied to polyester and nylon fabrics using application method Textile Fabrics (A). The polyester and nylon fabrics were tested for oil repellency, water repellency and spray repellency using Test Methods 3, 4 and 10. Results are in Table 9.

Example 17

An emulsion copolymer of ethylene-tetrafluoroethylene methacrylate/stearyl acrylate/vinylidene chloride was prepared using the process of Example 13 using a mixture of methacrylates (Product 9, 2.92 grams), stearyl acrylate (0.37 grams), and vinylidene chloride (0.37 grams), resulting in an emulsion copolymer having 4.1 weight % solids. The polymer was applied to polyester and nylon fabrics using application method Textile Fabrics (A). The polyester and nylon fabrics were tested for oil repellency, water repellency and spray repellency using Test Methods 3, 4 and 10. Results are in Table 9.

TABLE 9

| | Example 16 | Example 17 | Untreated |
|---|---|---|---|
| Polyester fabric | | | |
| Goal fluorine level, micrograms per gram | 4000 | 4000 | none |
| Oil repellency | 2 | 2 | 0 |
| Water repellency | 8 | 8 | 0 |
| Spray repellency rating | 80 | 70 | 0 |
| Nylon fabric | | | |
| Goal fluorine level, micrograms per gram | 4000 | 4000 | none |
| Water repellency | 5 | 3 | 0 |
| Spray repellency rating | 100 | 50 | 0 |

These results show that the fluorinated methacrylate copolymers of the invention provided excellent oil repellency, water repellency, and spray repellency for polyester textile fabrics, and provided good water repellency, and spray repellency for nylon textile fabrics.

Example 18

An emulsion copolymer of ethylene-tetrafluoroethylene methacrylate/stearyl methacrylate/vinylidene chloride was prepared using the process of Example 13 using a mixture of methacrylates (Product 9, 2.92 grams), stearyl methacrylate (0.37 grams), and vinylidene chloride (0.37 grams), resulting in an emulsion copolymer having 3.9 weight % solids. The polymer was applied to polyester fabric using application method Textile Fabrics (A). The polyester fabric was tested for water repellency and spray repellency using Test Methods 3 and 10. Results are in Table 10.

Example 19

An emulsion copolymer of ethylene-tetrafluoroethylene methacrylate/2-ethylhexyl methacrylate/vinylidene chloride was prepared using the process of Example 13 using a mixture of methacrylates (Product 9, 2.92 grams), 2-ethylhexyl methacrylate (0.73 grams), and vinylidene chloride (0 grams), resulting in an emulsion copolymer having 3.9 weight % solids. The polymer was applied to polyester fabric using application method Textile Fabrics (A). The polyester fabric was tested for water repellency and spray repellency using Test Methods 3 and 10. Results are in Table 10.

Example 20

An emulsion copolymer of ethylene-tetrafluoroethylene methacrylate/2-ethylhexyl methacrylate/vinylidene chloride was prepared using the process of Example 13 using a mixture of methacrylates (Product 9, 2.92 grams), 2-ethylhexyl methacrylate (0.37 grams), and vinylidene chloride (0.37 grams), resulting in an emulsion copolymer having 3.2 weight % solids. The polymer was applied to polyester fabric using application method Textile Fabrics (A). The polyester fabric was tested for water repellency and spray repellency using Test Methods 3 and 10. Results are in Table 10.

TABLE 10

| Polyester fabric | Example 18 | Example 19 | Example 20 | Untreated |
|---|---|---|---|---|
| Goal fluorine level, micrograms per gram | 4000 | 4000 | 4000 | none |
| Water repellency | 3 | 3 | 3 | 0 |
| Spray repellency rating | 50 | 50 | 50 | 0 |

These results show that the fluorinated methacrylate copolymers of the invention provided water repellency and spray repellency for polyester textile fabrics.

Example 21

An emulsion copolymer of ethylene-tetrafluoroethylene methacrylate/stearyl methacrylate/vinylidene chloride was prepared using the process of Example 13 using Product 9 (2.92 grams), stearyl methacrylate (0 grams), and vinylidene chloride (0.73 grams), resulting in an emulsion copolymer having 3.3 weight % solids. The polymer was applied to polyester and nylon fabrics using application method Textile Fabrics (A). The polyester and nylon fabrics were tested for water repellency using Test Method 3. Results are in Table 11.

Example 22

An emulsion copolymer of ethylene-tetrafluoroethylene methacrylate/styrene/vinylidene chloride was prepared using the process of Example 13 using Product 9 (2.92 grams), styrene (0.37 grams), and vinylidene chloride (0.37 grams), resulting in an emulsion copolymer having 2.9 weight % solids. The polymer was applied to polyester and nylon fabrics using application method Textile Fabrics (A). The polyester and nylon fabrics were tested for water repellency using Test Method 3. Results are in Table 11.

Example 23

An emulsion copolymer of ethylene-tetrafluoroethylene methacrylate/stearyl methacrylate/vinylidene chloride was prepared using the process of Example 13 using Product 9 (2.92 grams), stearyl methacrylate (0.37 grams), vinylidene chloride (0.37 grams), and ethylene glycol dimethacrylate (0.050 grams) resulting in an emulsion copolymer having 3.9 weight % solids. The polymer was applied to polyester and nylon fabrics using application method Textile Fabrics (A). The polyester and nylon fabrics were tested for water repellency using Test Method 3. Results are in Table 11.

TABLE 11

| | Example 21 | Example 22 | Example 23 | Untreated |
|---|---|---|---|---|
| Polyester fabric | | | | |
| Goal fluorine level, micrograms per gram | 2000 | 4000 | 4000 | none |
| Water repellency | 3 | 4 | 5 | 0 |
| Nylon fabric | | | | |
| Goal fluorine level, micrograms per gram | 2000 | 4000 | 4000 | none |
| Water repellency | 2 | 3 | 3 | 0 |

These results show that the fluorinated methacrylate copolymers of the invention provided water repellency for nylon and polyester textile fabrics.

Example 24

1,1,2,2,5,5,6,6,9,9,10,10-Dodecahydroperfluorododecyl acrylate (Compound 8, 2.40 grams), stearyl methacrylate (1.09 grams), hydroxyethyl methacrylate (0.87 grams), and 88 grams of butyl acetate were mixed and heated to 40° C. in a flask equipped a nitrogen purging, condenser, overhead stirrer and temperature probe, and stirred at 170 rpm for 30 minutes. The flask was switched to nitrogen blanket and heated to 10° C. 1 mL of a solution of VAZO 64 (0.06 g) in butyl acetate (20 mL) was added every 15 minutes for five hours, followed by heating at 100° C. for an additional four hours. Gas chromatography analysis of the reaction mixture showed that less than 5% of the monomers remained. The resulting copolymer of ethylene tetrafluoroethylene acrylate/stearyl methacrylate/hydroxyethyl methacrylate was applied to leather and Saltillo tile using the application methods previously described. The leather was tested for oil repellency and water repellency using Test Methods 2 and 3. The tile was tested for stain resistance using test Method 8. Results are in Tables 12 and 13.

TABLE 12

| Bovine leather | Example 24 | Untreated |
|---|---|---|
| Goal fluorine level, micrograms per gram | 400 | none |
| Oil repellency | 1 | 0 |
| Water repellency | 6 | 4 |

These results show that the fluorinated methacrylate copolymers of the invention provided effective water repellency and at least a modest oil repellency on bovine leather.

TABLE 13

| Saltillo | Example 24 | Untreated |
|---|---|---|
| Canola oil | 1 | 4 |
| Bacon grease | 3 | 4 |
| Motor oil | 3 | 4 |
| Lemon juice | 2 | 3 |
| Ketchup | 0 | 2 |
| Salad dressing | 2 | 4 |

These results show that the fluorinated methacrylate copolymers of the invention provided effective stain resistance on Saltillo tile.

Example 25

1,1,2,2,5,5,6,6,9,9,10,10-Dodecahydroperfluorododecyl acrylate (Compound 8, 2.70 grams), diethylaminoethyl methacrylate (0.505 grams), glycidyl methacrylate (0.080 grams), dodecyl mercaptan (0.006 grams), VAZO 64 (0.050 grams), sodium chloride (0.091 grams), and 50 grams of isopropyl alcohol were mixed until dissolved and nitrogen had purged the system, and then heated to 55° C. in a flask equipped a nitrogen purging, condenser, and overhead stirrer for 16 hours. Gas chromatography analysis of the reaction mixture showed that less than 5% of the monomers remained. Most of the isopropyl alcohol (about 40 grams) was removed by rotary evaporator. Water (14 grams) and glacial acetic acid (0.017 grams) were added, and the remaining isopropyl alcohol was removed by rotary evaporator, giving a solution containing about 2.5% by weight polymer solids in water. The polymer was applied to paper using the application method previously described and tested for oil repellency using Test Method 9. Results are in Table 14.

TABLE 14

| Paper | Example 25 | Untreated |
|---|---|---|
| Goal fluorine level, micrograms per gram | 3000 | 0 |
| KIT test rating | 1 | 0 |

These results show that the fluorinated methacrylate copolymers of the invention provided a modest measure of oil repellency.

What is claimed is:

1. A copolymer composition comprising monomers copolymerized in the following percentages by weight:
   (a) from about 20% to about 95% of a monomer, or mixture of monomers, of formula (I):

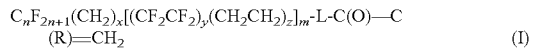
   $$C_nF_{2n+1}(CH_2)_x[(CF_2CF_2)_y(CH_2CH_2)_z]_m\text{-L-C(O)—C(R)}=CH_2 \quad (I)$$

wherein
   R is H, Cl, F or CH₃,
   L is O, S, NH, S—(CH₂)ᵣO, S—(CH₂)ᵣNH, OC(O)NH—CH₂CH₂O, NHC(O)NHCH₂CH₂O, S—(CH₂)ᵣOC(O)NHCH₂CH₂O, or S(CH₂)ᵣNHC(O)NHCH₂CH₂O,
   subscript n is an integer from 1 to about 6,
   subscript x is an integer from 1 to about 6,
   subscripts y, z and m are each independently 1, 2 or 3 or a mixture thereof,
   subscript r is from 1 to about 10,
   and wherein the total number of carbons in the fluorocarbon-hydrocarbon chain segment (formula (I) excluding L-C(O)—C(R)=CH2) ranges from about 8 to about 22, and
   (b) from about 5% to about 80% of at least one of:
   (i) an alkyl (meth)acrylate monomer having a linear, branched or cyclic alkyl group of from about 6 to about 18 carbons; or
   (II) a monomer of formula (II)

$$(R^2)_2N\text{—}R^3\text{—O—C(O)—C(R)}=CH_2 \quad (II)$$

wherein
   R is H, Cl, F or CH₃,
   each R² is independently a C₁ to C₄ alkyl; and
   R³ is a divalent linear or branched C₁ to C₄ alkylene; and
   wherein the nitrogen is from about 40% to 100% salinized; or
   (iii) a mixture thereof.

2. The composition of claim 1 wherein L is O, x is 2, y and z are each 1, and m is 1 or 2.

3. The composition of claim 1 wherein n is 4 or 6.

4. The composition of claim 1 wherein component (b) is an alkyl (meth)acrylate monomer having a linear, branched or cyclic alkyl group of from about 6 to about 18 carbons.

5. The composition of claim 1 wherein component (b) is a monomer of formula (II).

6. The composition of claim 1 further comprising at least one additional monomer copolymerized in the following percentage by weight:
   (c) from about 1% to about 35% vinylidene chloride, vinyl chloride, or vinyl acetate, or a mixture thereof; or
   (d) from about 0.5% to about 25% of at least one monomer selected from the group consisting of styrene, methyl-substituted styrene, chloromethyl-substituted styrene, 2-hydroxyethyl (meth)acrylate, ethylenediol di(meth)acrylate, N-methyloyl (meth)acrylamide, C₁-C₅ alkyl (meth)acrylate, and a compound of formula (III):

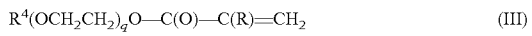
   $$R^4(OCH_2CH_2)_qO\text{—C(O)—C(R)}=CH_2 \quad (III)$$

wherein
   q is 2 to about 10;
   R⁴ is H, a C₁ to C₄ alkyl, or CH₂=C(R)C(O)—O—; and
   R is H, Cl, F or CH₃; or
   (e) from about 0.5% to about 10% of at least one monomer of formula (IV):

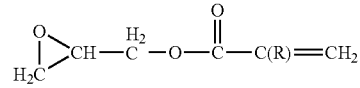

wherein
   R is H, Cl, F or CH₃; or
   (f) any combination thereof.

7. The composition of claim 6 wherein the additional monomer is (c) from about 1% to about 35% vinylidene chloride, vinyl chloride, or vinyl acetate, or a mixture thereof.

8. The composition of claim 6 wherein the additional monomer is (d) from about 0.5% to about 25% of at least one monomer selected from the group consisting of styrene, methyl-substituted styrene, chloromethyl-substituted styrene, 2-hydroxyethyl (meth)acrylate, ethylenediol di(meth)acrylate, N-methyloyl (meth)acrylamide, C₁-C₅ alkyl (meth)acrylate, and a compound of formula (III):

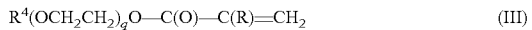
$$R^4(OCH_2CH_2)_qO\text{—C(O)—C(R)}=CH_2 \quad (III)$$

wherein
q is 2 to about 10;
R⁴ is H, a C₁ to C₄ alkyl, or CH₂=C(R)C(O)—O—; and
R is H, Cl, F or CH₃.

9. The composition of claim 6 wherein the additional monomer is (e) from about 0.5% to about 10% of at least one monomer of formula (IV):

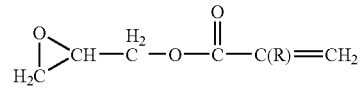

wherein
R is H, Cl, F or CH₃.

10. A substrate having contacted a composition of claim 6.

11. A substrate having contacted a composition of claim 1.

12. A substrate of claim 11 which is (a) a fibrous substrate selected from the group consisting of textiles, fabrics, fabric blends, polyamides, polyesters, polyolefins, spandex, rayon, cotton, wool, silk, hemp, carpet, wood, paper, leather, and combinations thereof; (b) a nonwoven material selected from the group consisting of fibers of glass, paper, cellulose acetate, nitrate, polyamides, polyesters, polyolefins, polyethylene, polypropylene, and combinations thereof; or (c) a hard surface substrate of porous or non-porous mineral selected from the group consisting of glass, stone, masonry, concrete, unglazed tile, brick, porous clay, unglazed concrete, granite, limestone, marble, grout, mortar, statuary, monuments, terrazzo, and gypsum board.

13. A method of treating a substrate to impart water repellency, oil repellency, stain resistance, soil resistance, stain release, and wicking comprising contacting the substrate with a copolymer composition comprising monomers copolymerized in the following percentages by weight:

(a) from about 20% to about 95% of a monomer, or mixture of monomers, of formula (I):

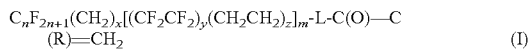

$$C_nF_{2n+1}(CH_2)_x[(CF_2CF_2)_y(CH_2CH_2)_z]_m\text{-L-C(O)—C(R)}\!=\!CH_2 \qquad (I)$$

wherein
R is H, Cl, F or CH$_3$,
L is O, S, NH, S—(CH$_2$)$_r$O, S—(CH$_2$)$_r$NH, OC(O)NH—CH$_2$CH$_2$O, NHC(O)NHCH$_2$CH$_2$O, S—(CH$_2$)$_r$OC(O)NHCH$_2$CH$_2$O, or S(CH$_2$)$_r$NHC(O)NHCH$_2$CH$_2$O,
subscript n is an integer from 1 to about 6,
subscript x is an integer from 1 to about 6,
subscripts y, z and m are each independently 1, 2 or 3 or a mixture thereof,
subscript r is from 1 to about 10,
and wherein the total number of carbons in the fluorocarbon-hydrocarbon chain segment (formula (I) excluding L-C(O)—C(R)=CH2) ranges from about 8 to about 22, and (b) from about 5% to about 80% of at least one of:
(i) an alkyl (meth)acrylate monomer having a linear, branched or cyclic alkyl group of from about 6 to about 18 carbons; or
(II) a monomer of formula (II)

$$(R^2)_2N\text{—}R^3\text{—}O\text{—}C(O)\text{—}C(R)\!=\!CH_2 \qquad (II)$$

wherein
R is H, Cl, F or CH$_3$,
each R$^2$ is independently a C$_1$ to C$_4$ alkyl; and
R$^3$ is a divalent linear or branched C$_1$ to C$_4$ alkylene; and
wherein the nitrogen is from about 40% to 100% salinized; or
(iii) a mixture thereof.

14. The method of claim 13 wherein the copolymer composition further comprises at least one additional monomer copolymerized in the following percentage by weight:

(c) from about 1% to about 35% vinylidene chloride, vinyl chloride, or vinyl acetate, or a mixture thereof; or (d) from about 0.5% to about 25% of at least one monomer selected from the group consisting of styrene, methyl-substituted styrene, chloromethyl-substituted styrene, 2-hydroxyethyl (meth)acrylate, ethylenediol di(meth)acrylate, N-methyloyl (meth)acrylamide, C$_1$-C$_5$ alkyl (meth)acrylate, and a compound of formula (III):

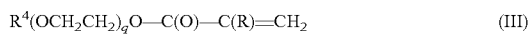

$$R^4(OCH_2CH_2)_qO\text{—}C(O)\text{—}C(R)\!=\!CH_2 \qquad (III)$$

wherein
q is 2 to about 10;
R$^4$ is H, a C$_1$ to C$_4$ alkyl, or CH$_2$=C(R)C(O)—O—; and
R is H, Cl, F or CH$_3$; or (e) from about 0.5% to about 10% of at least one monomer of formula (IV):

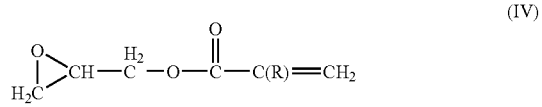

wherein
R is H, Cl, F or CH$_3$; or
(f) any combination thereof.

15. The method of claim 13 wherein L is O, x is 2, y and z are each 1, and m is 1 or 2.

16. The method of claim 13 wherein component (b) is an alkyl (meth)acrylate monomer having a linear, branched or cyclic alkyl group of from about 6 to about 18 carbons.

17. The method of claim 13 wherein component (b) is a monomer of formula (II).

18. The method of claim 13 wherein the substrate is (a) a fibrous substrate selected from the group consisting of textiles, fabrics, fabric blends, polyamides, polyesters, polyolefins, spandex, rayon, cotton, wool, silk, hemp, carpet, wood, paper, leather, and combinations thereof; (b) a nonwoven material selected from the group consisting of fibers of glass, paper, cellulose acetate, nitrate, polyamides, polyesters, polyolefins, polyethylene, polypropylene, and combinations thereof; or (c) a hard surface substrate of porous or nonporous mineral selected from the group consisting of glass, stone, masonry, concrete, unglazed tile, brick, porous clay, unglazed concrete, granite, limestone, marble, grout, mortar, statuary, monuments, terrazzo, and gypsum board.

19. The method of claim 13 wherein the composition is contacted with the substrate by means of exhaustion, spray, foam, flex-nip, nip, pad, kiss-roll, beck, skein, winch, liquid injection, overflow flood, dip, brush, roll, spray, roller, doctor blade, wipe, casting, or immersion.

20. The method of claim 13 wherein the composition is contacted with the substrate in the presence of
A) an agent providing at least one surface effect selected from the group consisting of no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, and sun protection, or
B) a surfactant, pH adjuster, cross linker, wetting agent, blocked isocyanate, wax extender, or hydrocarbon extender, or
C) a mixture thereof.

* * * * *